(12) United States Patent
Ueda

(10) Patent No.: US 9,910,198 B2
(45) Date of Patent: Mar. 6, 2018

(54) OPTICAL FILTER AND OPTICAL APPARATUS

(71) Applicant: CANON KABUSHIKI KAISHA, Tokyo (JP)

(72) Inventor: Kei Ueda, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/603,724

(22) Filed: Jan. 23, 2015

(65) Prior Publication Data

US 2015/0212245 A1    Jul. 30, 2015

(30) Foreign Application Priority Data

Jan. 29, 2014  (JP) .................. 2014-013869

(51) Int. Cl.
  *G02B 1/115*  (2015.01)
  *G02B 5/28*  (2006.01)

(52) U.S. Cl.
  CPC .................. *G02B 5/285* (2013.01)

(58) Field of Classification Search
  CPC ........ G02B 1/115; G02B 5/285; G02B 5/288; G02B 5/28; G02B 5/201; G02B 5/286; G02B 5/305; G02B 6/29361; C03C 17/3417; C03C 17/3452
  USPC ....... 359/580, 581, 582, 586, 588, 589, 590, 359/577, 584
  See application file for complete search history.

(56) References Cited

U.S. PATENT DOCUMENTS

| | | | |
|---|---|---|---|
| 2011/0170164 A1* | 7/2011 | Wang | G02B 5/286 |
| | | | 359/290 |
| 2013/0188254 A1* | 7/2013 | Li | G02B 5/284 |
| | | | 359/589 |
| 2015/0043058 A1* | 2/2015 | Saito | B32B 7/02 |
| | | | 359/359 |

FOREIGN PATENT DOCUMENTS

| | | |
|---|---|---|
| JP | 2007-225935 A | 9/2007 |
| JP | 2007-334318 A | 12/2007 |
| JP | 2008015234 A | 1/2008 |
| JP | 2008-058561 A | 3/2008 |

OTHER PUBLICATIONS

Office Action issued in Japanese Appln. No. 2014-013869 dated Dec. 26, 2017. English translation provided.

* cited by examiner

*Primary Examiner* — Bumsuk Won
*Assistant Examiner* — Henry Duong
(74) *Attorney, Agent, or Firm* — Rossi, Kimms & McDowell LLP

(57) ABSTRACT

An optical filter includes a first multi-layer having a width W1 and including a first optical layer and a second optical layer that are made of materials different from each other and that are alternately laminated, the first optical layer having a refractive index nH and an average layer thickness dH, and the second optical layer having a refractive index nL lower than nH and an average layer thickness dL, a second multi-layer having a width W2 and including the first and the second optical layers alternately laminated, the first and the second multi-layers are included in each of unit structures arranged being shifted from each other by a shift amount D in a lamination direction of the first and the second optical layers, and predetermined conditions are satisfied.

12 Claims, 14 Drawing Sheets

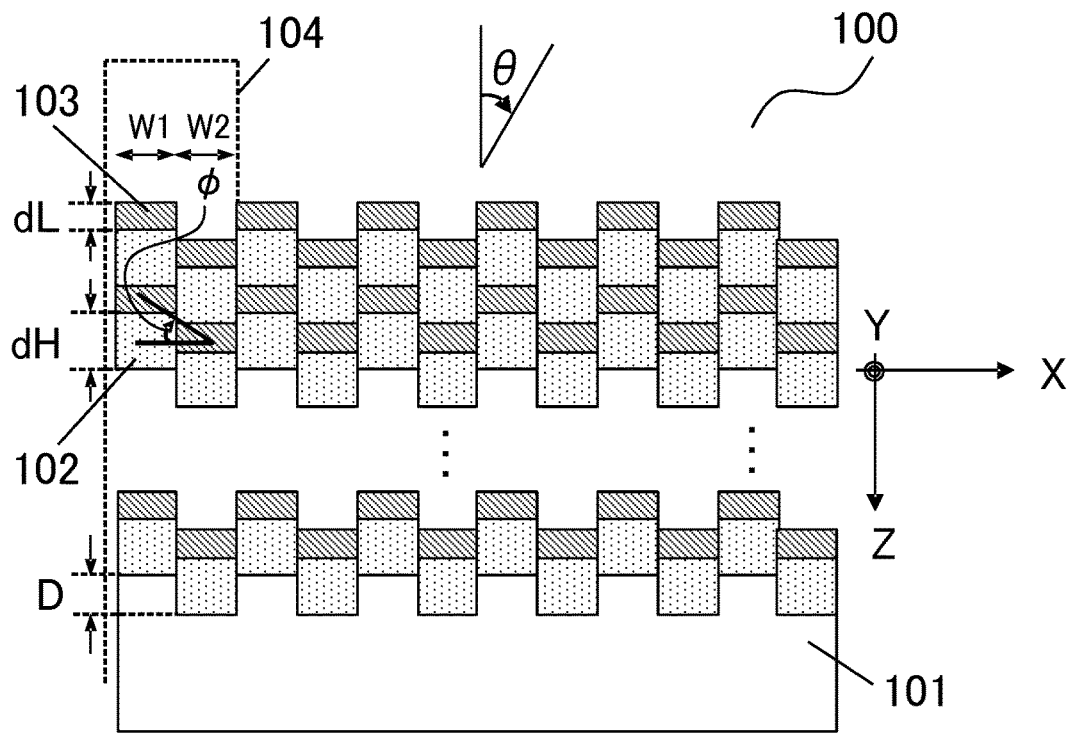
FIG. 1A
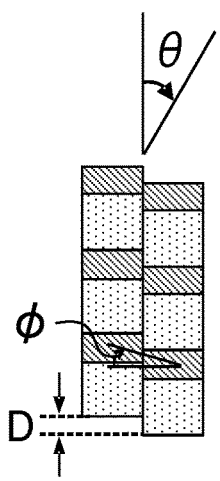 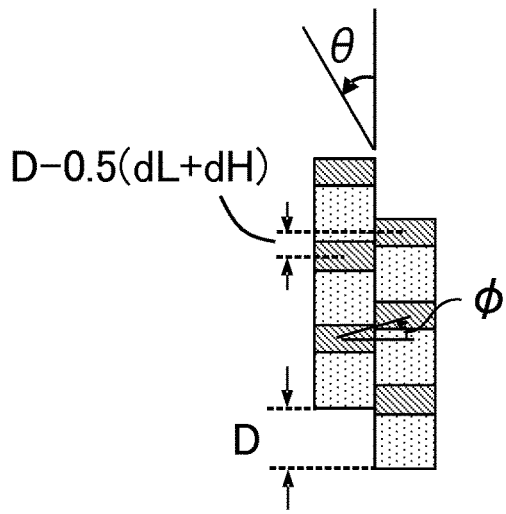
FIG. 1B

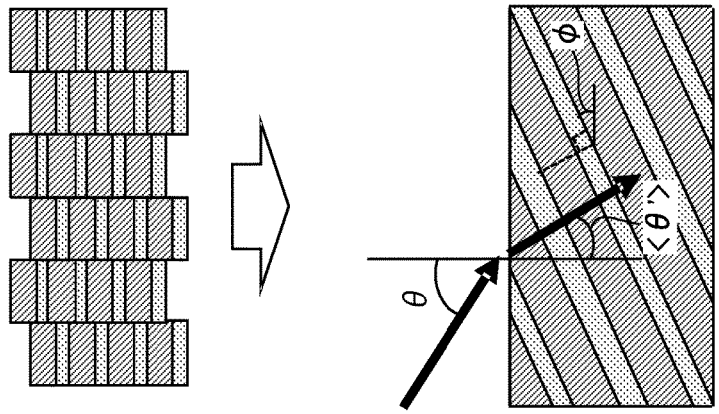
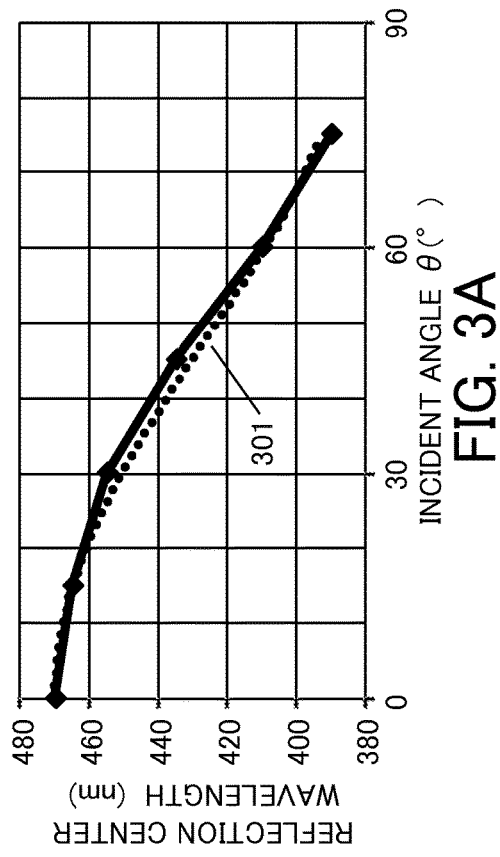
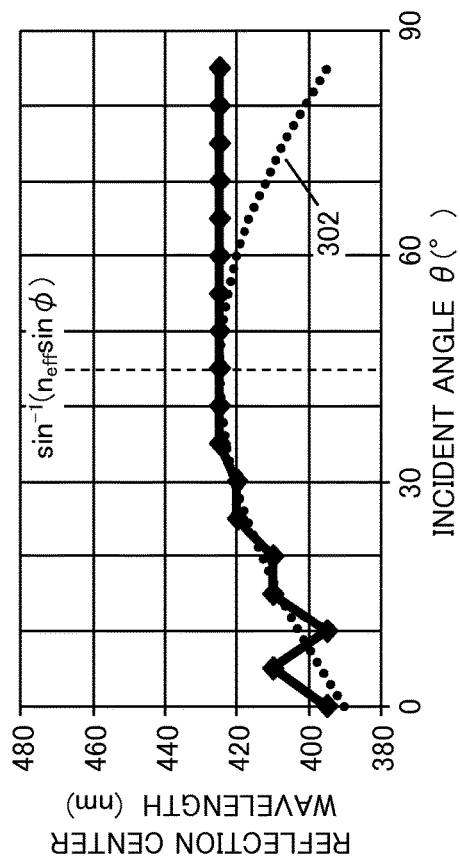

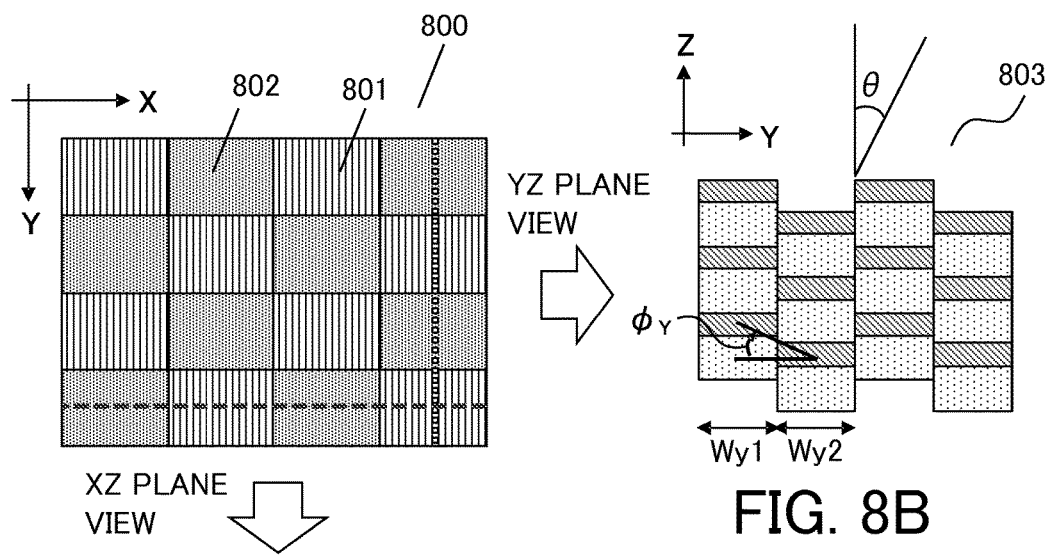
FIG. 8A
FIG. 8B
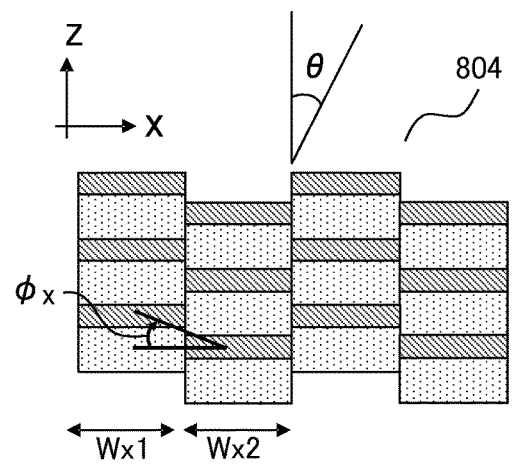
FIG. 8C
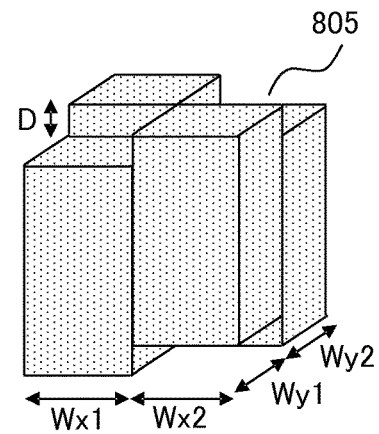
FIG. 8D

US 9,910,198 B2

OPTICAL FILTER AND OPTICAL APPARATUS

BACKGROUND OF THE INVENTION

Field of the Invention

The present invention relates to an optical filter, and more particularly relates to an optical filter having color selectivity.

Description of the Related Art

Conventionally, a color-selective filter has been used to select light of a desired wavelength band from an incident light beam. Such a color-selective filter is typically a spectral filter (multi-layer interference filter) utilizing multi-layer interference. The multi-layer interference filter is formed of a laminated periodic structure with its refractive index and layer thickness adjusted in accordance with the desired wavelength band. Unlike with an absorption spectral filter, dispersion with the multi-layer interference filter involves no absorption, and hence no light quantity loss and no heat generation, which is an advantage.

However, since an effective layer thickness of the multi-layer interference filter changes depending on a light beam propagation angle inside a medium, a reflected wavelength changes depending on an incident angle. Thus, dispersion of a light beam incident on the multi-layer interference filter at an aperture angle has an adverse effect due to a wavelength shift.

Japanese Patent Laid-open No. 2008-58561 and Japanese Patent Laid-open No. 2007-334318 disclose methods of reducing incident angle dependencies in a dichroic filter and a dichroic prism by introducing an M layer having an intermediate refractive index in place of an L layer having a low refractive index and by introducing an absorbing layer to compensate a spectral characteristic when light is obliquely incident.

However, the method disclosed in Japanese Patent Laid-open No. 2008-58561 cannot effectively reduce an optical path length change due to the oblique incidence. The method disclosed in Japanese Patent Laid-open No. 2007-334318 has problems such as a reduced total light quantity, heat generation due to absorption, and a reduced bandwidth due to the oblique incidence.

SUMMARY OF THE INVENTION

The present invention provides an optical filter and an optical apparatus that have a reduced change of a reflected wavelength within a desired incident angle range.

An optical filter as one aspect of the present invention includes a first multi-layer having a width W1 and including a first optical layer and a second optical layer that are made of materials different from each other and that are alternately laminated, the first optical layer having a refractive index nH and an average layer thickness dH, and the second optical layer having a refractive index nL lower than the refractive index nH and an average layer thickness dL, and a second multi-layer having a width W2 and including the first and the second optical layers alternately laminated, the first and the second multi-layers are included in each of unit structures arranged being shifted from each other by a shift amount D in a lamination direction of the first and the second optical layers, and predetermined relations are satisfied.

An optical apparatus as one aspect of the present invention includes the optical filter.

Further features and aspects of the present invention will become apparent from the following description of exemplary embodiments with reference to the attached drawings.

BRIEF DESCRIPTION OF THE DRAWINGS

FIGS. 1A and 1B are configuration diagrams of an optical filter in an embodiment (Embodiment 1) of the present invention and relational diagrams of an inclination angle $\phi$ and an incident angle $\theta$.

FIGS. 3A to 3C illustrate incident angle dependencies of reflection center wavelengths of the optical filters of the comparative example and this embodiment.

FIGS. 8A to 8D are configuration diagrams of an optical filter having a two-dimensional periodicity in this embodiment.

DESCRIPTION OF THE EMBODIMENTS

Figure 2A:
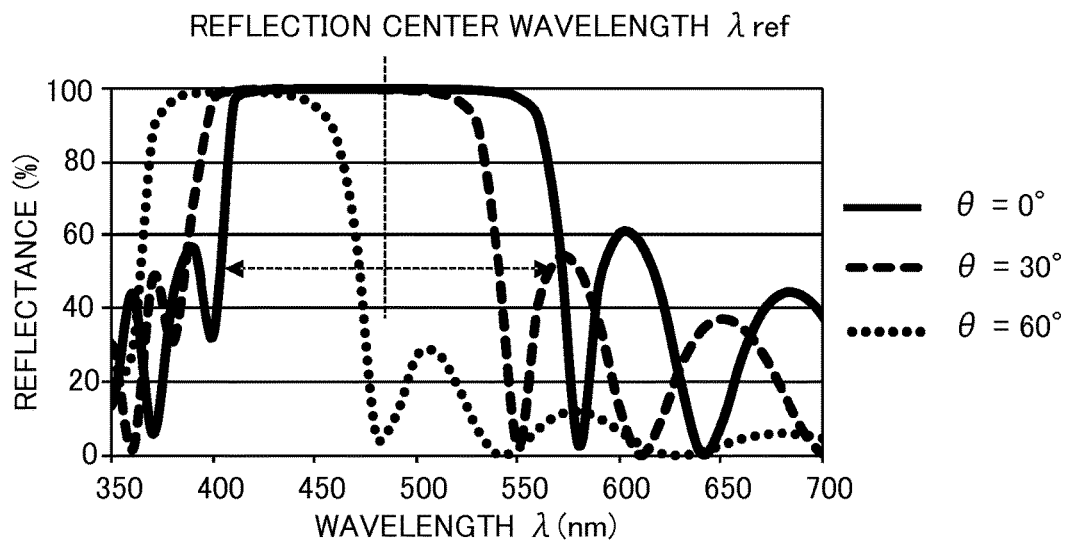
FIGS. 2A and 2B illustrate incident angle dependencies of spectral reflectance of optical filters of a comparative example and this embodiment.

Exemplary embodiments of the present invention will be described below with reference to the accompanied drawings.

First, referring to FIG. 1A, a configuration of an optical filter (optical element) in an embodiment of the present invention will be described. FIG. 1A is a configuration diagram of an optical filter 100. The optical filter 100 includes a plurality of optical layers laminated on a substrate 101 having a visible light translucency of a refractive index ns, reflects light of a predetermined band, and transmits light of other bands. In the present embodiment, directions orthogonal to each other in a lamination plane are defined as X and Y directions, and a depth direction (direction orthogonal to the lamination plane) is defined as a Z direction. Signs of the Z direction are defined such that a direction (downward direction in FIG. 1A) from a surface layer to the substrate 101 is a positive Z direction.

In the present embodiment, the optical filter 100 includes an optical layer repetitively laminated m times, the optical layer being made of at least two kinds of materials (the optical layer including a first optical layer and a second optical layer made of materials different from each other). To prevent ripples, for example, the optical filter 100 may include three kinds or more of optical layers.

In the present embodiment, the optical filter 100 includes, in this repetitive structure (among the optical layers), an optical layer 102 (the first optical layer) having a refractive index nH and an average layer thickness dH in the Z direction (a lamination direction). The optical filter 100 also includes an optical layer 103 (the second optical layer) having a refractive index nL that is lower than nH and an average layer thickness dL in the Z direction. The optical filter 100 includes a plurality of arranged unit structures 104. Each unit structure 104 includes a first multi-layer including the optical layers 102 and 103 alternately laminated m times and having a width W1, and a second multi-layer including the optical layers 102 and 103 alternately laminated and having a width W2 (two multi-layer structures). These two multi-layer structures (the first and the second multi-layers) having the widths W1 and W2 are shifted from each other by a shift amount D in the Z direction (lamination direction), which is referred to as a staggered structure. In the unit structure 104, the optical layers 102 and 103 are alternately laminated on the substrate 101 on which, for example, a trenched patterning is formed as illustrated in FIG. 1A. However, the present embodiment is not limited to the substrate with the trenched patterning.

In the optical filter 100, the unit structures 104 are arranged on the substrate 101. In the present embodiment, the unit structures 104 each satisfy condition expressions (1) and (2) below. The optical filter with such unit structures can have a reduced incident angle dependency of a reflected wavelength or transmit wavelength.

$$15° < \phi < 35° \quad (1)$$

$$1.8 < dH/dL < 5.0 \quad (2)$$

In the condition expression (1), $\phi$ represents an inclination angle of a structure (multi-layer structure) that is defined in the unit structure 104 illustrated in FIG. 1A. The inclination angle $\phi$ is defined by expression (3a) or expression (3b) below.

$$\phi = \tan^{-1}(|D|/0.5(W1+W2)) \text{ (for } |D| 0.5(dL+dH)) \quad (3a)$$

$$\phi = \tan^{-1}(((dL+dH)-|D|)/0.5(W1+W2)) \text{ (for } |D| > 0.5(dL+dH)) \quad (3b)$$

Since a multi-layer period in the depth (Z) direction is (dL+dH), a magnitude relation of the inclination angle $\phi$ between expressions (3a) and (3b) is inverted at D=0.5(dL+dH). Thus, a smaller one of absolute values of D obtained by expressions (3a) and (3b) is defined as the inclination angle $\phi$. Hereinafter, expressions (3a) and (3b) are collectively referred to as expression (3).

FIG. 1B defines signs of a rotational direction between the inclination angle $\phi$ thus defined and an incident angle $\theta$. In FIG. 1B, [a] and [b] represent cases in which the inclination angle $\phi$ is defined by expressions (3a) and (3b), respectively. A rotational direction in which the inclination angle $\phi$ opens (increases) from an XY plane direction (horizontal direction) in FIG. 1B is defined as a positive rotational direction of the incident angle $\theta$. As illustrated in [a] in FIG. 1B, in the case of |D|≤0.5(dL+dH), a clockwise direction is defined as the positive rotational direction of the incident angle $\theta$. On the other hand, as illustrated in [b] in FIG. 1B, in the case of |D|>0.5(dL+dH), a counterclockwise direction is defined as the positive rotational direction of the incident angle $\theta$. Hereinafter, conditions on the optical filter needed to further reduce the incident angle dependency will be described.

First, prior to the description of the conditions, a brief comparative description will be made of an incident angle dependency of a reflection center wavelength for each of a simple multi-layer structure with no in-plane fine structure and a staggered multi-layer structure in the present embodiment. In the comparative description, calculation is performed to obtain incident angle dependencies of reflection spectra of the simple multi-layer structure with no in-plane fine structure and the staggered multi-layer structure that have structure parameters listed in Table 1. The staggered multi-layer structure is completely uniform in the Y direction and has the unit structures formed in a one-dimensional grating in the X direction. All spectrum calculations are performed by a finite-difference time-domain (FDTD) method or a rigorous coupled-wave analysis (RCWA) method. The FDTD method is a technique of dividing an input dielectric constant distribution structure to form a fine mesh space and solving Maxwell's equations for neighboring meshes to calculate time evolution of an electric field and a magnetic field. The RCWA method is a calculation technique of calculating a Fourier series expansion of an input dielectric constant distribution of each layer in a step grating to calculate a reflection diffraction component and a transmission diffraction component that are obtained based on boundary conditions of the layer given by Maxwell's equations, which is sequentially performed to obtain reflection and transmission diffraction efficiencies of the whole structure.

FIG. 2A illustrates an incident angle dependency of a spectral reflectance of the simple multi-layer structure as a comparative example whose structure parameters are listed in Table 1. In FIG. 2A, a horizontal axis represents a wavelength $\lambda$ (nm), and a vertical axis represents a reflectance (%). For the sake of discussion of an incident angle dependency of a spectral reflection wavelength shift amount, as illustrated in FIG. 2A, a reflection center wavelength $\lambda$ref is defined as a wavelength at a middle point between a wavelength for a reflectance of 50% on a short wavelength side skirt of the reflectance plot and a wavelength for a reflectance of 50% on a long wavelength side skirt of the reflectance plot. FIG. 2A illustrates results for the incident angle $\theta$=0, 30, and 60 degrees. In this example, incident light has P polarization. For the simple multi-layer structure, a monotonic short wavelength shift is observed as the incident angle $\theta$ increases.

Figure 2B:
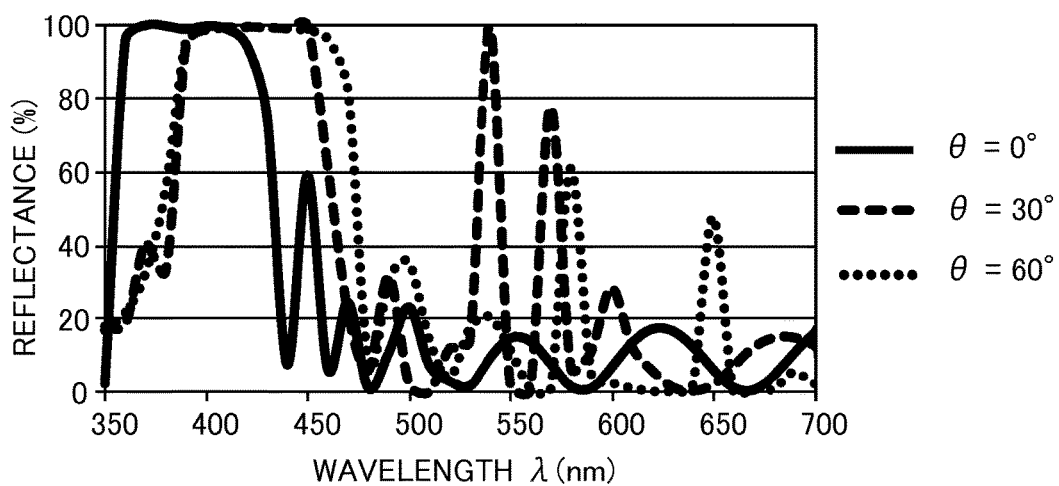

Next, the incident angle dependency of the staggered multi-layer structure in the present embodiment will be described. FIG. 2B illustrates an incident angle dependency of a spectral reflectance of the staggered multi-layer structure in the present embodiment whose structure parameters are listed in Table 1. FIG. 2B illustrates results for the incident angle $\theta$=0, 30, and 60 degrees. In this example, an incident plane is an XZ plane vertical to the grating, and incident light has P polarization (TM polarization). In FIG.

2B, the reflection center wavelength λref of the staggered multi-layer structure monotonically increases as the incident angle increases. This is a wavelength shift in a direction opposite to that of the incident angle dependency of the simple multi-layer structure as illustrated in FIG. 2A.

FIG. 3A illustrates an incident angle dependency of the reflection center wavelength λref of the simple multi-layer structure as the comparative example whose structure parameters are listed in Table 1. FIG. 3B illustrates an incident angle dependency of the reflection center wavelength λref of the staggered multi-layer structure in the present embodiment whose structure parameters are listed in Table 1. In each of FIGS. 3A and 3B, a horizontal axis represents the incident angle θ, and a vertical axis represents the reflection center wavelength λref. In FIGS. 3A and 3B, solid lines represent the incident angle dependencies of the reflection center wavelengths λref of the multi-layer structures having structure parameters listed in Table 1. In FIG. 3A, a dotted line 301 represents a calculation model result derived by Snell's law.

As illustrated in FIG. 3A, the incident angle dependency of the reflection center wavelength of the simple multi-layer structure as the comparative example is similar to the calculation model result represented by the dotted line 301. On the other hand, the incident angle dependency of the reflection center wavelength of the staggered multi-layer structure in the present embodiment cannot be explained with a calculation model derived by Snell's law similarly to the simple multi-layer structure because the reflection center wavelength λref has a long wavelength shift as the incident angle θ increases. The structure in the present embodiment is an anisotropic structure whose period in the in-plane X direction is substantially equal to the wavelength, which is sufficiently larger than a period in the depth (Z) direction.

Thus, the multi-layer in the present embodiment is assumed as a tilted multi-layer structure as illustrated in FIG. 3C, and an approximate calculation of the reflection center wavelength is performed. The approximate calculation employs an average advancing angle $<\theta'>$ in a medium for simplicity. The average advancing angle $<\theta'>$ is given by $<\theta'>=\sin^{-1}(\sin\theta/n_{eff})$ by Snell's law, where an effective refractive index $n_{eff}$ is calculated by $\{2/(1/nH^2+1/nL^2)\}^{1/2}$ when light having polarization (TM polarization) parallel to an array direction of the grating is vertically incident. The calculation of the effective refractive index $n_{eff}$ is based on an assumption of one-dimensional grating structure filled with a medium having the refractive index nH and a medium having the refractive index nL at a ratio of 1:1 therebetween. With the value of $<\theta'>$ thus calculated, the incident angle θ dependency of the reflection center wavelength λref of the tilted multi-layer structure is given by a relational expression of λref (θ)=λref'*cos ($<\theta'>-\phi$). In this equation, λref' is a reflected wavelength determined by an optical path length nd of a constituent film, and is given by λref'=2 (nH*dH+ nL*dL)*cos φ. In the equation for λref', cos φ is a term attributable to a decrease in an effective thickness of the optical layer due to the assumption as the tilted multi-layer structure.

In FIG. 3B, a dotted line 302 illustrates an incident angle dependency of the reflection center wavelength λref of a calculation model result with the approximation as the tilted multi-layer structure. The dotted line 302 of the calculation model result excellently reproduces the incident angle dependency in the present embodiment for the incident angle in a range of 0° to $\sin^{-1}(n_{eff}*\sin\phi)$. The angle of $\sin^{-1}(n_{eff}*\sin\phi)$ corresponds to an incident angle in air when the average advancing angle $<\theta'>$ in a medium is equal to φ. The relational expression of λref(θ) indicates that, as a difference between the average advancing angle $<\theta'>$ of light in the medium and the inclination angle φ increases, a change in the effective thickness of the layer increases, and a wavelength shift amount for a change in the angle increases. Thus, the monotonic long wavelength shift for an increase in the incident angle of light on the staggered multi-layer structure cannot be described by the incident angle dependency of the simple multi-layer structure derived by Snell's law, but can be described by the approximation to the tilted multi-layer structure.

FIGS. 3A and 3B are compared to indicate that a wavelength shift amount of the staggered multi-layer structure is largely reduced as compared to the simple multi-layer structure in an angle range centering on $\sin^{-1}(n_{eff}*\sin\phi)$. In other words, in this angle range centering on $\sin^{-1}(n_{eff}*\sin\phi)$, the staggered multi-layer structure serves as a filter to reduce the wavelength shift amount. For a sufficiently large incident angle range required in using the filter, the average advancing angle $<\theta'>$ obtained when light is incident at an angle at a middle point of the incident angle range can be made equal to the inclination angle φ. This enables a large reduction of the wavelength shift amount in the required incident angle range. When the inclination angle φ satisfies the range of condition expression (1), the optical filter can have a reduced incident angle dependency of the reflected wavelength in a sufficiently wide incident angle range centering on $\sin^{-1}(n_{eff}*\sin\phi)$.

To increase the reduction in the incident angle dependency, condition expression (2) needs to be satisfied. Next, condition expression (2) will be explained by describing a dH/dL dependency of a wavelength shift amount Δλplus of a wavelength λplus for a reflectance (or transmissivity) of 50% on a long wavelength side skirt of the reflectance (or transmissivity) plot, when the incident angle is changed. The wavelength shift amount Δλplus is expressed with λplus (|θ|max) and λplus (|θ|min) that are λplus for incident angles of |θ|max and |θ|min. Specifically, the wavelength shift amount Δλplus is defined by Δλplus=λplus(|θ|max)−λplus(|θ|min) and can be positive or negative. The incident angles |θ|max and |θ|min are respectively maximum and minimum values of an absolute value of the incident angle on an optional incident plane vertical to the lamination plane and parallel to a direction of arrangement of the two multi-layer structures in the unit structure that are shifted by the shift amount D from each other.

Figure 4A:
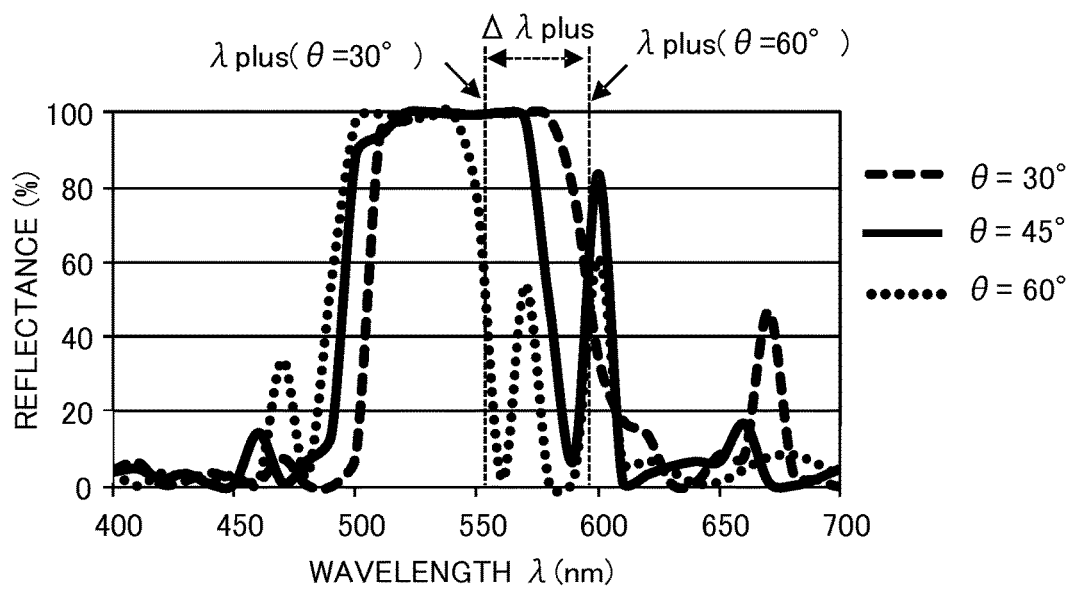
FIGS. 4A and 4B illustrate the incident angle dependency of the spectral reflectance of the optical filter in this embodiment and a dH/dL dependency of a wavelength shift amount $\Delta\lambda$plus.

FIG. 4A illustrates an incident angle dependency of a spectral reflectance of the optical filter 100 and illustrates definitions of λplus and Δλplus for |θ|min=30° and |θ|max=60°. In the staggered multi-layer structure, a wavelength on a long wavelength side skirt of the spectral reflectance qualitatively changes more largely than that on a short wavelength side skirt thereof when the incident angle changes, and thus Δλplus is used as an evaluation amount of the incident angle dependency of the wavelength shift amount. In FIG. 4A, the optical layer 102 has a refractive index nH of 2.36 and a physical layer thickness dH of 70 nm. The optical layer 103 has a refractive index nL of 1.47 and a physical layer thickness dL of 115 nm. The optical filter 100 includes staggered unit structures arranged to form a one-dimensional grating in the X direction with the refractive index ns of the substrate 101=1.47, the widths W1 and W2=135 nm, D=92.5 nm, and the number m of repetitions of eight. The incident plane is the XZ plane, the polarization is P polarization (TM polarization), and the incident angle range is from θ=30° to θ=60°. In such a structure, dH/dL is 0.61, and Δλplus is +40 nm.

Figure 4B:
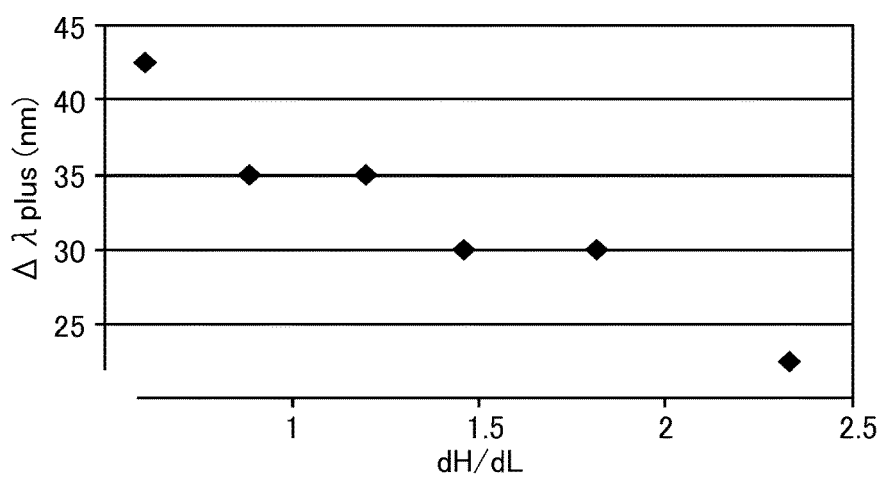

Next, a dH/dL dependency of Δλplus when the ratio of dH and dL is changed so that the reflection center wavelength for θ=45° is constant in a range of $\lambda_0$ to 540 nm will be described. FIG. 4B illustrates the dH/dL dependency of Δλplus. In FIG. 4B, dH and dL are respectively 70 nm and 115 nm for a lowest dH/dL value of 0.61 on a horizontal axis, and dH and dL are respectively 105 nm and 45 nm for a highest dH/dL value of 2.33 on the horizontal axis. As illustrated in FIG. 4B, as dH/dL increases, Δλplus reduces. In the plot in FIG. 4B, 2.33 is the highest dH/dL value. Further increasing dH/dL causes significant performance degradation such as bandwidth narrowing and reflectance decrease, which is not desirable. Thus, to effectively reduce the incident angle dependence, the ration of dH/dL needs to be set so as to satisfy condition expression (2).

Conditions of Δλplus and the incident angle range when the incident angle range is specified will be described. The description will be made on the maximum value |θ|max and the minimum value |θ|min of the absolute value of the incident angle of light on the optional incident plane, which is vertical to the lamination plane and parallel to the direction of the arrangement of the two multi-layer structures in the unit structure that are shifted by the shift amount D. The wavelength shift amount Δλplus preferably satisfies condition expression (4) below. The minimum and maximum values |θ|min and |θ|max preferably satisfy condition expression (5) below.

$$|\Delta\lambda plus| < 30 \text{ nm} \qquad (4)$$

$$\cos|\theta|min - \cos|\theta|max > 0.365 \qquad (5)$$

Condition expression (5) defines the incident angle range. Those structures used in the comparison of the wavelength shift amount Δλplus in FIG. 4B satisfy condition expression (4) when they satisfy condition expression (2).

When the incident angle range is determined, the inclination angle φ preferably satisfies condition expression (6) below.

$$0.5(|\theta|max+|\theta|min)/2 < \sin^{-1}(n_{eff}*\sin \phi) < 1.5(|\theta|max+|\theta|min)/2 \qquad (6)$$

In condition expression (6), $n_{eff}$ is the effective refractive index given by the relational expression of $n_{eff} = \{2/(1/nH^2+1/nL^2)\}^{1/2}$. Condition expression (5) indicates that $\sin^{-1}(n_{eff}*\sin \phi)$ has a value in a range of 0.5 to 1.5 times a central angle of the defined incident angle range. The value of $\sin^{-1}(n_{eff}*\sin \phi)$ corresponds to an incident angle in air when the average advancing angle <θ'> is equal to φ in the medium.

As described above, the reflection center wavelength of the structure in the present embodiment can be approximated by calculation based on the assumption as the tilted multi-layer structure. Thus, the reflection center wavelength $\lambda_0$ for an incident angle of (|θ|max+|θ|min)/2, and dH, dL, nH, and nL in the unit structure preferably satisfy condition expression (7) below.

$$0.35*\lambda_0 < (nH*dH+nL*dL)\cos \phi < 0.65*\lambda_0 \qquad (7)$$

In condition expression (7), cos φ is a term attributable to a decrease in the effective thickness of the optical layers due to the assumption as the tilted multi-layer structure.

For the reflection center wavelength, when light is vertically incident, no reflection diffraction preferably occurs at least. For this reason, the widths W1 and W2 preferably satisfy condition expression (8) below.

$$(W1+W2) < 0.85*\lambda_0 \qquad (8)$$

To approximately calculate the reflection center wavelength based on the assumption as the tilted multi-layer structure, the absolute value |D| of the shift amount in the unit structure preferably has a value centering on a half period (dH+dL)/2 in the Z direction. For this reason, the absolute value |D| preferably satisfies condition expression (9).

$$0.25(dH+dL) < |D| < 0.75(dH+dL) \qquad (9)$$

A large shift from the half period (dH+dL)/2 in the Z direction causes a strong reflection in a band centering on the wavelength $\lambda_0'$ estimated based on an interference reflection condition of $nH*dH+nL*dL=\lambda_0'/2$ in the simple multi-layer structure, which is not preferable. The widths W1 and W2 are not necessarily the same value but only need to satisfy condition expressions (10) and (11) below.

$$W1 \geq W2 \qquad (10)$$

$$W1/(W1+W2) \leq 0.8 \qquad (11)$$

Figure 5:
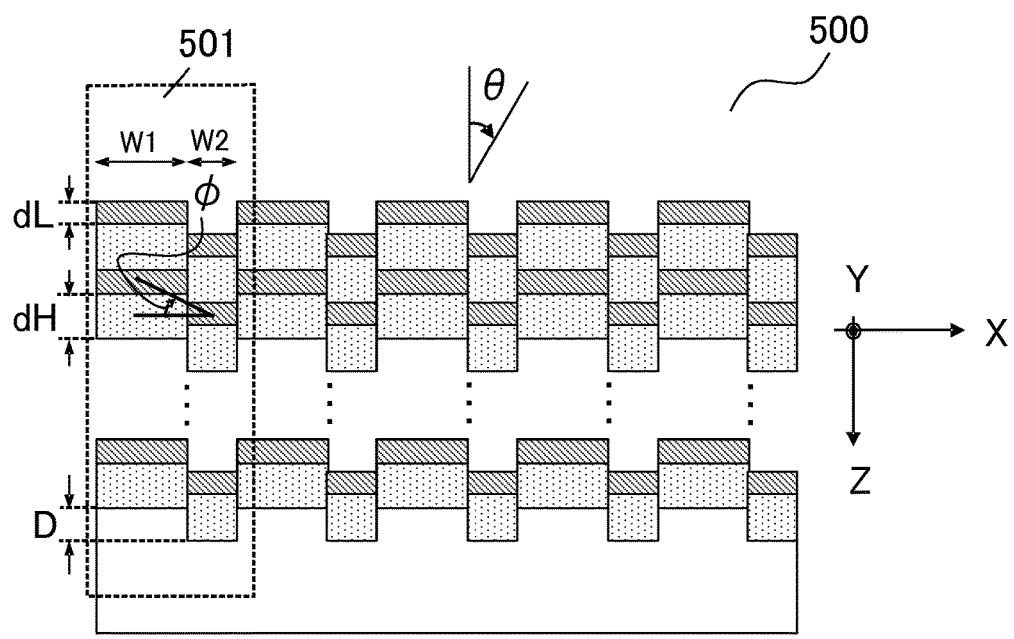
FIG. 5 is a configuration diagram of an optical filter whose widths W1 and W2 are different from each other in this embodiment.

FIG. 5 is a configuration diagram of an optical filter 500 in which the widths W1 and W2 are different from each other. The optical filter 500 includes an arrangement of unit structures 501 satisfying the relation of W1>W2. Other configurations except for the relation of the widths W1 and W2 are the same as those of the optical filter 100 described referring to FIG. 1A, and thus detailed description thereof will be omitted. When the value on the right-hand side of condition expression (11) is exceeded, not only a reflection attributable to the staggered structure but also the reflection for the band centering on the wavelength $\lambda_0'$ estimated based on the interference condition of $nH*dH+nL*dL=\lambda_0'/2$ in the simple multi-layer structure increase, which is not preferable.

The above description is made on conditions related to the unit structures. Next, condition expressions related to arrangement of the unit structures will be described. The unit structures are not necessarily arranged regularly. For example, the unit structures may be arranged such that untidiness Δz due to a shift in the Z direction between neighboring unit structures in the optical filter satisfies condition expression (12) below for all the unit structures.

$$0 \leq |\Delta z| \leq 2(dH+dL) \qquad (12)$$

Figure 6:
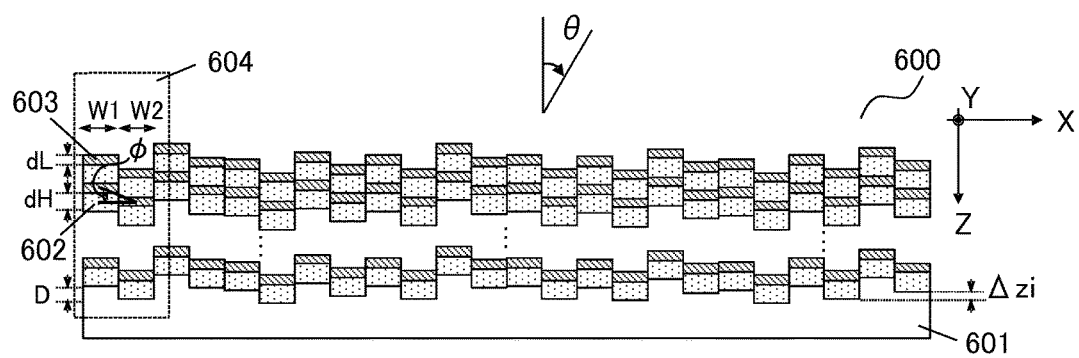
FIG. 6 is a configuration diagram of an optical filter including an irregular shift amount between unit structures in this embodiment (Embodiment 4).

FIG. 6 is a configuration diagram of an optical filter 600 in which the shift amount D between unit structures 604 is irregular. The optical filter 600 in FIG. 6 includes the unit structures 604 arranged with the untidiness Δz (irregularity) due to the shift amount D between the unit structures 604 in the Z direction. Other characteristics except for the untidiness Δz are the same as those of the optical filter 100 described above referring to FIG. 1A, and thus detailed description thereof is omitted. When |Δz| is at its lower limit of zero in condition expression (12) for all unit structures, the optical filter 600 has a completely periodic array structure. When |Δz| exceeds the value on the right-hand side of condition expression (12), a scattering component due to the untidiness Δz is increased, which is not preferable.

The unit structures may be arranged with a gap (space) therebetween. When P represents a distance between centers of the unit structures, W1, W2, and P preferably satisfy condition expression (13) below.

$$0.5(W1+W2)/P \leq 1 \qquad (13)$$

In condition expression (13), its left-hand side represents an array structure with a filling rate of 50% of the unit structures 604 on a substrate 601, and its right-hand side represents an array structure with a filling rate of 100%.

Figure 7:
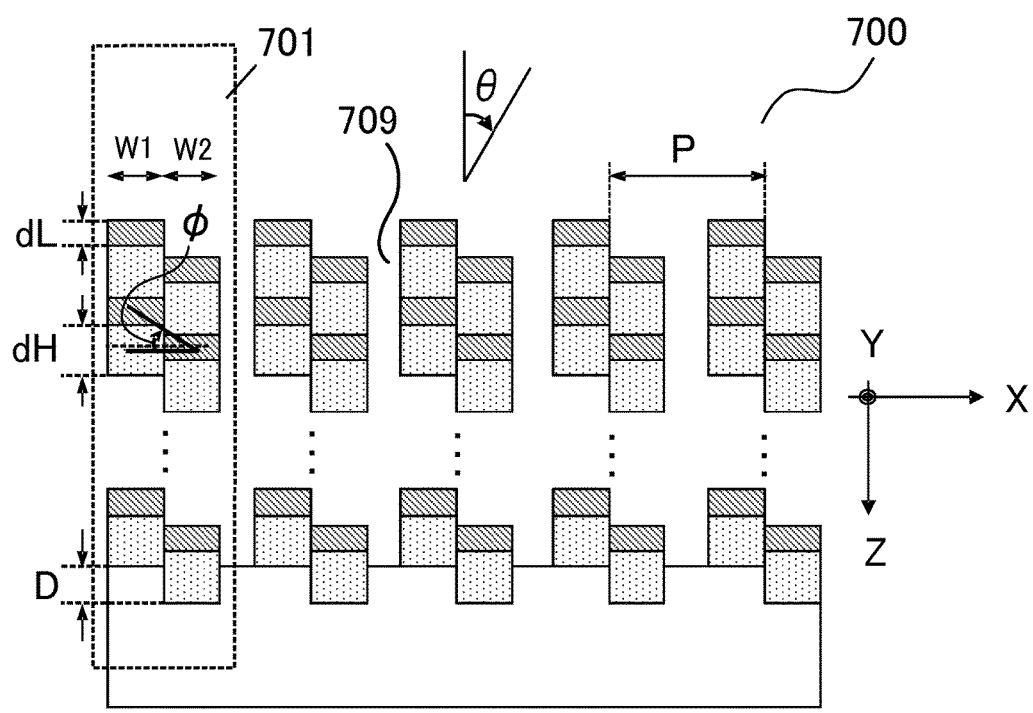
FIG. 7 is a configuration diagram of an optical filter including a gap between unit structures in this embodiment.

FIG. 7 is a configuration diagram of an optical filter 700 including a gap (space) 709 between unit structures 701. The optical filter 700 in FIG. 7 has the same configuration as that of the optical filter 100 described above referring to FIGS. 1A and 1B except for the gap 709 introduced between the unit structures 701. Thus, detailed description thereof will be omitted. As long as condition expression (13) is satisfied, the unit structures 701 of the optical filter 700 may be untidily formed without any arrangement periodicity. The value of (W1+W2)/P less than the left-hand side of condition expression (13) leads to a large reflectance decrease, which is not preferable.

The optical filter 700 may include a ripple lowering layer in addition to the first and the second multi-layers. The first and the second multi-layers may each include this ripple lowering layer. The ripple lowering layer desirably has a refractive index between nH and nL. Moreover, the ripple lowering layer preferably includes two optical layers (third and fourth optical layers).

The present embodiment describes so far a structure having one-dimensional periodicity but is not limited thereto. The present embodiment is also applicable to a staggered multi-layer structure having two-dimensional periodicity such that unit structures are (two-dimensionally) arranged to form a grating in each of the in-plane X and Y directions, because this multi-layer structure serves as an optical filter that reduces incident angle dependencies on the XZ plane and the YZ plane.

FIGS. 8A to 8D are configuration diagrams of an optical filter 800 having two-dimensional periodicity. FIG. 8A is a plan view of a patterned shape of a multi-layer structure having two-dimensional periodicity when viewed in the Z direction. In FIG. 8A, reference numeral 801 denotes a raised region, and reference numeral 802 denotes a recess region. The staggered multi-layer structure having two-dimensional periodicity includes a unit structure that has a staggered structure with the shift amount D in the Y direction as well as in the X direction. As illustrated in FIGS. 8B and 8C, Wx1 and Wx2 respectively represent widths of the raised region 801 and the recess region 802 in the X direction, and Wy1 and Wy2 respectively represent their widths in the Y direction. As illustrated in FIG. 8D, this unit structure 805 includes four multi-layer structures respectively having the widths Wx1, Wx2, Wy1, and Wy2 and disposed being shifted from each other by the shift amount D in the Z direction to form a staggered shape, and has a rectangular shape in a plan view in the Z direction. FIGS. 8B and 8C illustrate shapes 803 and 804 that are sectional shapes along the XZ plane and the YZ plane, respectively. With the widths Wx1, Wx2, Wy1, and Wy2, similarly to the inclination angle φ, inclination angles φX and φY are defined by expressions (3a'), (3b'), (3a"), and (3b") below.

$$\phi X=\tan^{-1}(|D|/(0.5(Wx1+Wx2))) \text{ (for } |D|\leq 0.5(dL+dH)) \quad (3a')$$

$$\phi=\tan^{-1}(((dL+dH)-|D|)/(0.5(Wx1+Wx2))) \text{ (for } |D|>0.5(dL+dH)) \quad (3b')$$

$$\phi Y=\tan^{-1}(|D|/(0.5(Wy1+Wy2))) \text{ (for } |D|\leq 0.5(dL+dH)) \quad (3a'')$$

$$\phi Y=\tan^{-1}(((dL+dH)-|D|)/(0.5(Wy1+Wy2))) \text{ (for } |D|>0.5(dL+dH)) \quad (3b'')$$

To reduce the incident angle dependency, φX and φY respectively defined in the X direction and the Y direction need to satisfy condition expression (2') and (2") below, and preferably satisfy condition expression (6') and (6") below.

$$15°<\phi X<35° \quad (2')$$

$$15°<\phi Y<35° \quad (2'')$$

$$0.5(|\theta X|max+|\theta X|min)/2<\sin^{-1}(n_{eff}*\sin \phi X)< 1.5(|\theta X|max+|\theta X|min)/2 \quad (6')$$

$$0.5(|\theta Y|max+|\theta Y|min)/2<\sin^{-1}(n_{eff}*\sin \phi Y)< 1.5(|\theta Y|max+|\theta Y|min)/2 \quad (6'')$$

In condition expression (6') and (6"), φX and φY represent light beam incident angles in the YZ plane and in the XZ plane, respectively. In addition, |θX|max, |θX|min, |θY|max, and |θY|min are maximum values and minimum values of the light beam incident angles in the planes. This structure has reduced incident angle dependencies in the XZ plane and the YZ plane, which is preferable.

As for conditions related to the randomness of arrangement that are described above, each unit structure may intentionally have errors greater than manufacturing errors. Condition expressions (1), (2), (6), (7), (8), (9), (10), and (11) represent conditions related to unit structures and only need to be satisfied by the individual unit structures. The unit structures with errors can reduce narrow band reflection that is likely to occur in a desired transmission wavelength band. Thus, it is effective to have errors in the structures depending on their usage.

A fine element structure included in the optical filter in the present embodiment is manufactured by, for example, laminating layers on a finely fabricated substrate. Methods of this fine fabrication include a typical etching technique and a nanoimprint technique. Methods of forming the laminated layers include a typical evaporation coating method and a sputtering method. An auto-cloning technique of obtaining multiple lamination of a zigzag shape diffraction grating by repeatedly performing lamination and etching may be used although it produces a sectional shape different from a rectangle. The fine fabrication is not limited to the manufacturing methods described above, and a fine patterned shape fabrication method and a laminated layer forming method appropriate for the present embodiment may be used in manufacturing.

In some method of forming the laminated layers, the structure is likely to become out of a rectangular shape nearer the surface layer because of, for example, lateral deposition, and thus the inclination angle φ is always defined by expression (3) based on the widths W1 and W2 of the structure of a lowermost layer and the shift amount D thereof in the Z direction.

Embodiment 1

Next, the optical filter in Embodiment 1 of the present invention will be described. The optical filter in the present embodiment (an optical filter in Embodiment 1G) that reflects a green band is designed to reduce a wavelength shift in an incident angle range of 45±15 degrees, and is used in, for example, a white light dispersing dichroic filter in a liquid crystal projector. Hereinafter, a blue band is 400 to 500 nm, the green band is 500 to 600 nm, and a red band is 600 to 700 nm, but each band is not strictly limited to these wavelength bands.

The configuration of the optical filter 100 in the present embodiment is the same as that illustrated in FIG. 1A, and thus detailed description thereof will be omitted. The optical filter 100 includes the optical layers 102 and 103 alternately and repeatedly laminated on the synthetic quartz substrate 101 having a refractive index ns of 1.47, the optical layer 102 (first optical layer) made of TiO$_2$ and having a refractive index nH of 2.36, and the optical layer 103 (second optical layer) made of SiO$_2$ and having a refractive index nL of 1.47. The optical layer 102 has a physical layer thickness dH of 105 nm, and the optical layer 103 has a physical layer thickness dL of 45 nm. The optical filter 100 includes the optical layer 102 and the optical layer 103 alternately and repeatedly laminated eight times. The optical filter 100 includes the unit structures 104 each including multi-layer structures that have widths W1 and W2 of 135 nm and are arranged in the X direction being shifted by the shift amount D of 75 nm given by (dL+dH)/2 in the Z direction. The unit structures 104 have identical shapes in the Y direction. In this manner, the optical filter 100 includes the unit structures 104 arranged on the substrate 101 to form a one-dimensional grating in the X direction.

FIG. 1A illustrates a shape of the configuration that the optical layer 102 and the optical layer 103 are laminated on the substrate 101 provided with rectangular patterning of the one-dimensional grating, but the substrate 101 does not necessarily need to be provided with any patterning. The unit structure 104 has an inclination angle ϕ of 29.1°, which satisfies condition expression (1). The value of dH/dL is 2.33, which satisfies condition expression (2). Structure parameters of the present embodiment (Embodiment 1G) are listed in Table 2.

Figure 9:
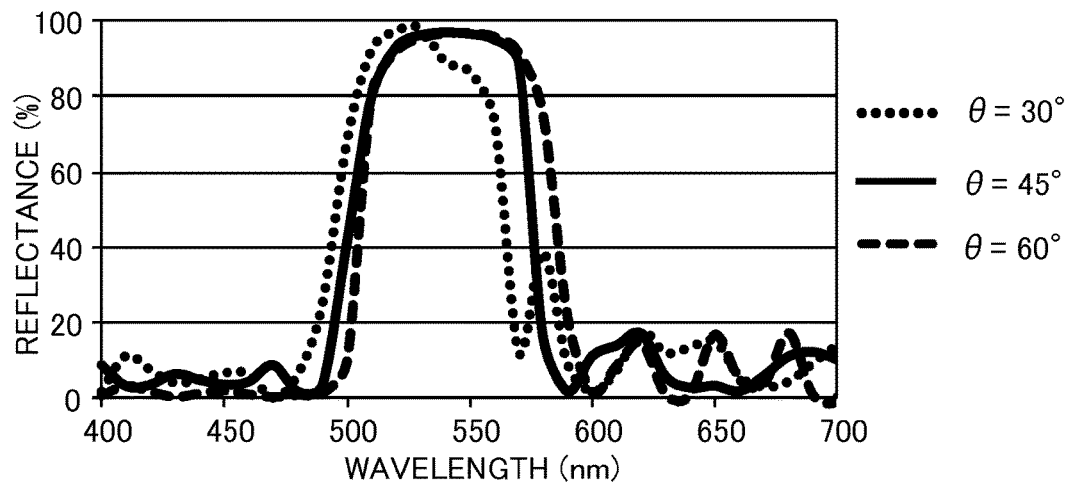
FIG. 9 illustrates the incident angle dependency of the spectral reflectance of the optical filter in Embodiment 1.

Next, referring to FIG. 9, a reflectance spectrum of a green band reflection dichroic filter in the present embodiment will be described. FIG. 9 illustrates the incident angle dependency of the spectral reflectance of the optical filter 100 in the present embodiment. In FIG. 9, a horizontal axis represents a wavelength (nm), and a vertical axis represents the reflectance (%). The incident plane is the XZ plane, and the polarization is P polarization (TM polarization). For an incident angle θ of 45°, the reflection center wavelength $\lambda_0$ is 540 nm, the reflectance is not smaller than 90%, and a reflection band has a full width at half maximum of 80 nm. For a range of the incident angle θ of 30 to 60 degrees, Δλplus is 22.5 nm, which satisfies condition expressions (4) and (5). Condition expressions (6) to (8) are also satisfied as in Table 2. Structure parameters satisfy condition expressions (9) to (13).

Figure 10:
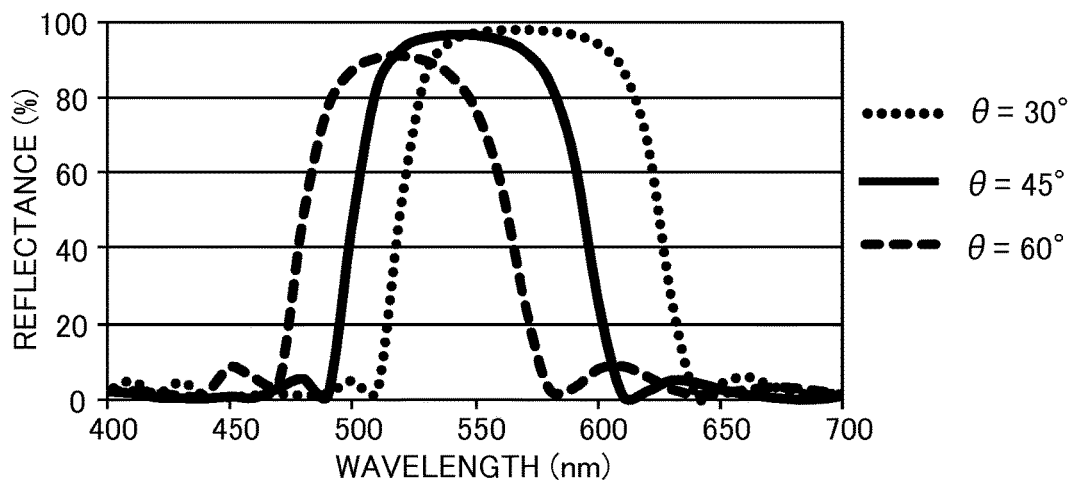
FIG. 10 illustrates an incident angle dependency of a spectral reflectance of an optical filter as comparative example 1.

Next, referring to FIG. 10, an incident angle dependency of a reflection spectrum of a dichroic filter as comparative example 1 that includes a simple multi-layer structure not including the in-plane fine structure and reflects the green band for an incident angle θ of 45° will be described. FIG. 10 illustrates an incident angle dependency of a spectral reflectance of an optical filter as comparative example 1. For a change of the incident angle θ from 30 to 60 degrees, Δλplus is calculated to be −50 nm. This indicates a reduction of the incident angle dependency of the optical filter of the present embodiment (Embodiment 1G).

Substantially constant multiplications of dH, dL, W1, W2, and D among the structure parameters in the present embodiment (Embodiment 1G) enable designing of a blue band reflection dichroic filter and a red band reflection dichroic filter. Structure parameters in Embodiment 1B of the blue band reflection filter and Embodiment 1R of the red band reflection filter are listed in Table 2.

Figure 11A:
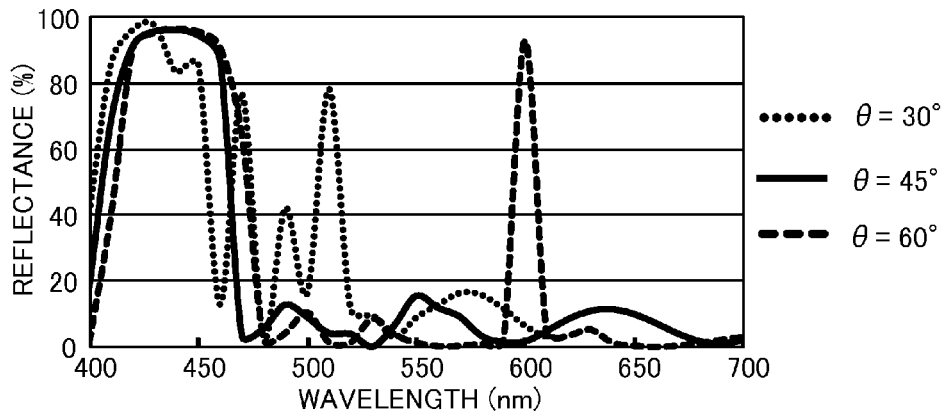
FIGS. 11A and 11B illustrate the incident angle dependency of the spectral reflectance of the optical filter in Embodiment 1.
Figure 11B:
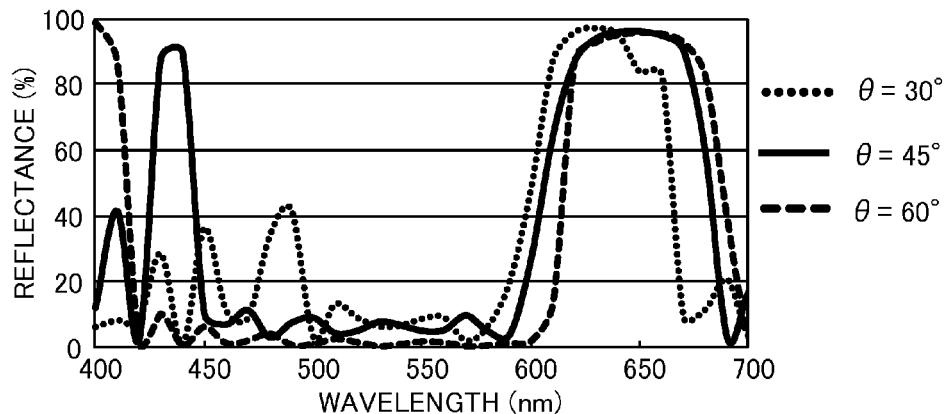

FIGS. 11A and 11B respectively illustrate incident angle dependencies of reflectance spectra of the blue band reflection dichroic filter (an optical filter in Embodiment 1B) and the red band reflection dichroic filter (an optical filter in Embodiment 1R). The incident plane is the XZ plane, and the polarization is P polarization (TM polarization). For a change of the incident angle θ from 30 to 60 degrees, Δλplus is 20 nm in FIG. 11A illustrating Embodiment 1B, and Δλplus is 25 nm in FIG. 11B illustrating Embodiment 1R. Both of the filters serve as dichroic filters to reduce the incident angle dependencies.

The present embodiment is not limited to the parameters (structure parameters) listed in Table 2. Substantially constant multiplications of dH and dL, W1, W2, and D among the structure parameters enable designing of a dichroic filter reflects other wavelength band.

Embodiment 2

Next, an optical filter in Embodiment 2 of the present invention will be described. The optical filter in the present embodiment is designed such that a transmission wavelength band is substantially constant in a broad range of the incident angle θ from 0 to 60 degrees, and is used as, for example, an absorption color filter. The optical filter in the present embodiment has, unlike a conventional absorption color filter, such an advantage that problems related to heat and durability are not likely to occur.

Figure 12:
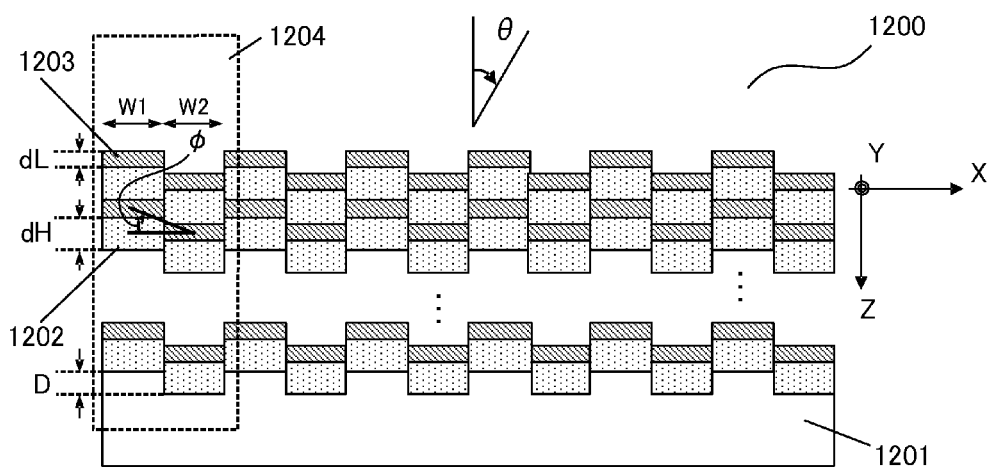
FIG. 12 is a configuration diagram of an optical filter in Embodiment 2.

A configuration of this optical filter 1200 in the present embodiment is as illustrated in FIG. 12, and detailed description thereof will be omitted. The optical filter 1200 includes optical layers 1202 and 1203 alternately laminated on a synthetic quartz substrate 1201 having a refractive index ns of 1.47, the optical layer 1202 (the first optical layer) having a refractive index nH of 2.36 and made of TiO$_2$, and the optical layer 1203 (the second optical layer) having a refractive index nL of 1.47 and made of SiO$_2$. The optical layer 1202 has a physical layer thickness dH of 75 nm, and the optical layer 1203 has a physical layer thickness dL of 35 nm. The optical filter 1200 includes the optical layer 1202 and the optical layer 1203 alternately laminated 10 times. The optical filter 1200 includes a plurality of unit structures 1204 each including multi-layer structures having widths W1 and W2 of 175 nm and arranged in the X direction being shifted by a shift amount D of 55 nm given by (dL+dH)/2 in the Z direction. The unit structures 1204 have identical shapes in the Y direction. The optical filter 1200 includes the unit structures 1204 arranged on the substrate 1201 to form a one-dimensional grating in the X direction.

FIG. 12 illustrates a structure that the optical layer 1202 and the optical layer 1203 are laminated on the substrate 1201 provided with rectangular patterning of the one-dimensional grating, but the substrate 1201 does not necessarily need to be provided with any patterning. Each unit structure 1204 has an inclination angle ϕ of 17.4°, which satisfies condition expression (1). The value of dH/dL is 2.14, which satisfies condition expression (2). Structure parameters of the present embodiment are listed in Table 3.

Figure 13A:
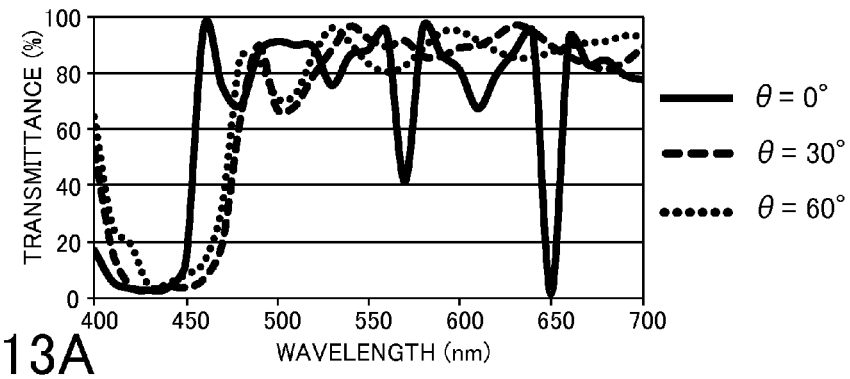
FIGS. 13A to 13D illustrate incident angle dependencies of spectral transmittance and spectral reflectance of the optical filter in Embodiment 2.
Figure 13B:
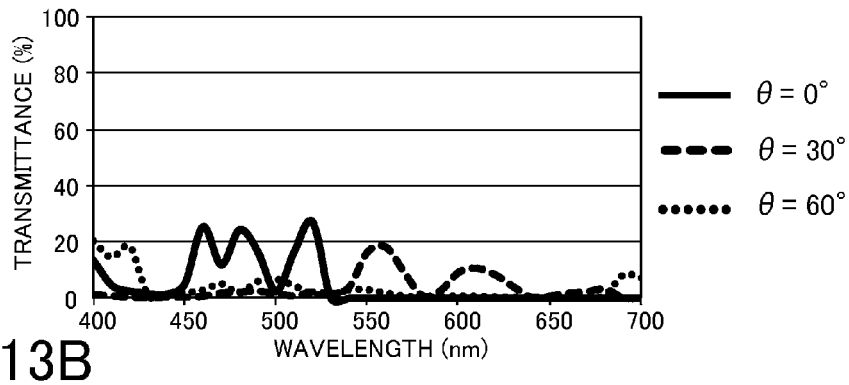
Figure 13C:
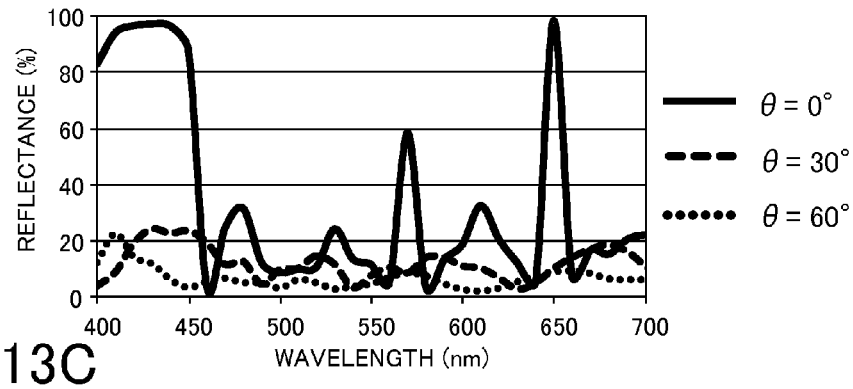
Figure 13D:
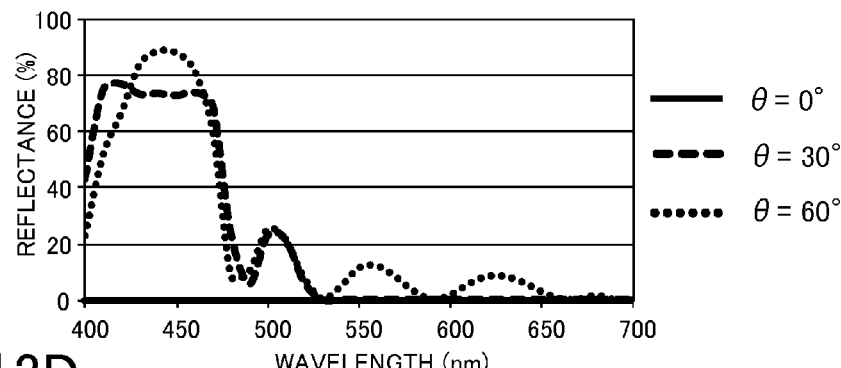

FIGS. 13A to 13D illustrate incident angle dependencies of spectral reflectance and transmissivity of the optical filter 1200 in the present embodiment. FIG. 13A illustrates a zeroth diffraction order transmissivity spectrum of the blue band reflection color filter, and FIG. 13B illustrates a first diffraction order transmissivity spectrum of the blue band reflection color filter. FIG. 13C illustrates a zeroth diffraction order reflectance spectrum of the blue band reflection color filter, and FIG. 13D illustrates a first diffraction order reflectance spectrum of the blue band reflection color filter. The incident plane is the XZ plane, and the polarization is P polarization (TM polarization). For a reflection center wavelength $\lambda_0$ of 435 nm, the unit structure 1204 has a structure width W of 350 nm given by W=W1+W2, which is close to an incident wavelength. Thus, as illustrated in FIG. 13D, reflection diffraction occurs from $\theta=30°$.

The present embodiment assumes usage as an absorption color filter, that is, use of zeroth transmitted light, and thus $\Delta\lambda$plus of a zeroth transmission spectrum illustrated in FIG. 13A is used for characteristics evaluation. $\Delta\lambda$plus of the zeroth transmission spectrum for a range of the incident angle $\theta$ from 0 to 60 degrees is 20 nm, which satisfies condition expressions (4) and (5). As shown in Table 3, the conditions represented by condition expressions (6) to (8) are also satisfied. Structure parameters satisfy condition expressions (9) to (13). At each incident angle $\theta$, a significant wavelength shift of a reflection band is not observed, and an averaged zeroth transmissivity of not smaller than 75% is obtained in a transmission band in which $\lambda$ is not smaller than 500 nm. Thus, the optical filter 1200 in the present embodiment functions as a reflection color filter with a reduced change of a transmitted wavelength when the incident angle changes.

Figure 14:
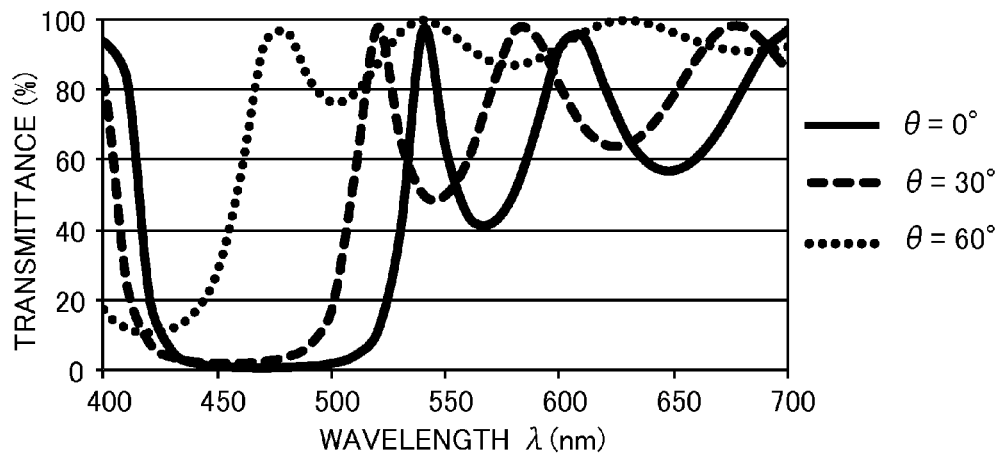
FIG. 14 illustrates an incident angle dependency of a spectral transmittance of an optical filter as comparative example 2.

Next, referring to FIG. 14, an incident angle dependency of a transmissivity spectrum of a dichroic filter as comparative example 2 that includes a simple multi-layer structure having no in-plane fine structure and reflects the blue band when light is incident at $\theta=0°$ will be described. Structure parameters of comparative example 2 are listed in Table 4. For a change of the incident angle $\theta$ from 0 to 60 degrees, $\Delta\lambda$plus is calculated to be −70 nm. Thus, an incident angle dependency of the optical filter 1200 in the present embodiment is largely reduced. Substantially constant multiplications of dH, dL, W1, W2, and D among the structure parameters of the present embodiment enable designing of a reflection color filter for other wavelength band.

Embodiment 3

Next, an optical filter in Embodiment 3 of the present invention will be described. Similarly to Embodiment 1, the optical filter in the present embodiment is designed to reduce any wavelength shift for the incident angle range of 45±15 degrees. The optical filter in the present embodiment is used as, for example, a white light dispersing dichroic filter in a liquid crystal projector.

Figure 15:
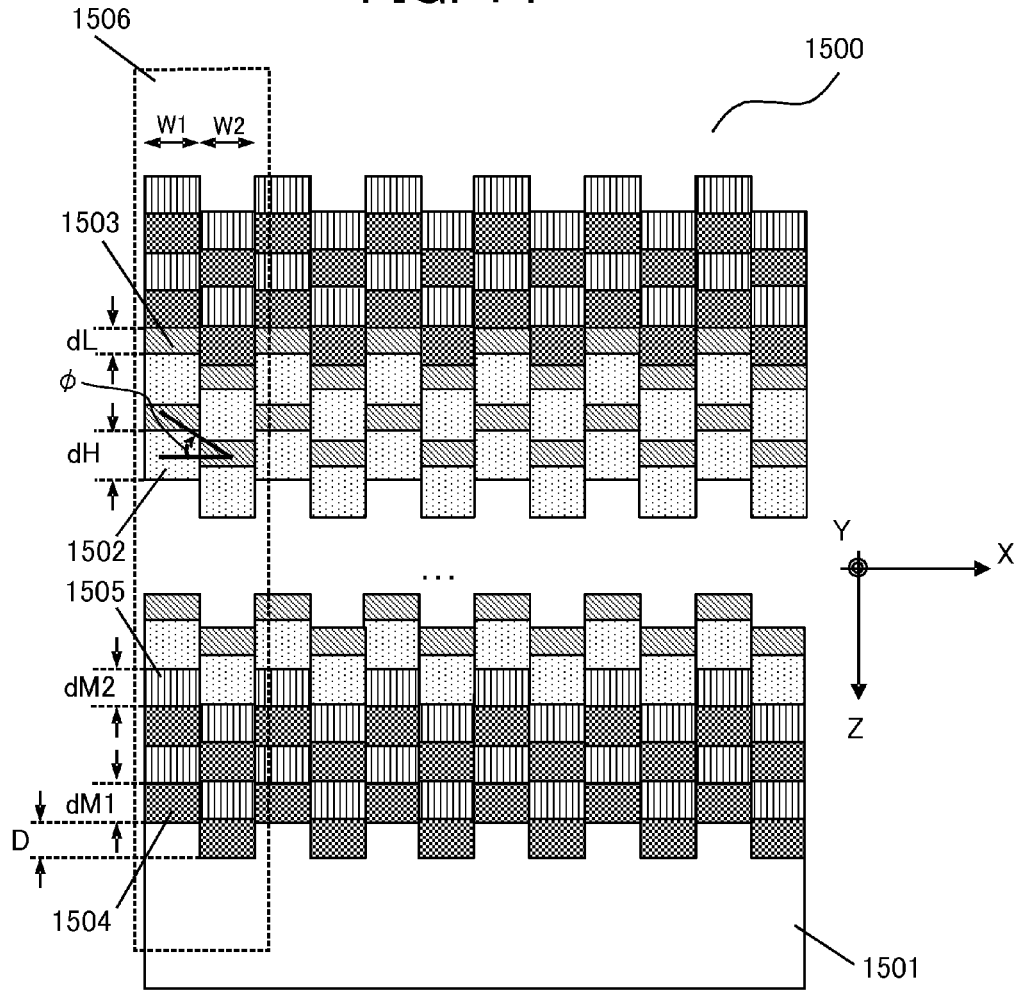
FIG. 15 is a configuration diagram of an optical filter in Embodiment 3.

A configuration of an optical filter 1500 in the present embodiment is as illustrated in FIG. 15, and detailed description thereof will be omitted. The optical filter 1500 includes optical layers 1502 and 1503 alternately arranged on a synthetic quartz substrate 1501 having a refractive index ns of 1.47, the optical layer 1502 (the first optical layer) having a refractive index nH of 2.36 and made of $TiO_2$, and the optical layer 1503 (the second optical layer) having a refractive index nL of 1.47 and made of $SiO_2$. The optical layer 1502 has a physical layer thickness dH of 105 nm, and the optical layer 1503 has a physical layer thickness dL of 45 nm. The optical filter 1500 includes the optical layer 1502 and the optical layer 1503 repeatedly laminated. The optical filter 1500 includes a plurality of unit structures 1506 each including multi-layer structures having widths W1 and W2 of 135 nm and arranged in the X direction being shifted by a shift amount D of 75 nm given by (dL+dH)/2 in the Z direction.

The optical filter 100 in Embodiment 1 includes two kinds of optical layers without ripple reduction designing. On the other hand, in the optical filter 1500 in the present embodiment includes, two double-layered structures each including a first intermediate refractive index optical layer (the third optical layer) 1504 and a second intermediate refractive index optical layer (the fourth optical layer) 1505 are introduced as a ripple lowering layer at each of a position closest to the surface layer and a position closest to the substrate. A refractive index nM1 of the first intermediate refractive index optical layer 1504 and a refractive index nM2 of the second intermediate refractive index optical layer 1505 are set to be values between the refractive index nH and the refractive index nL. Structure parameters in the present embodiment are listed in Table 5. The optical filter 1500 includes the unit structures 1506 having identical shapes in the Y direction and periodically arranged to form a grating in the X direction. The repetitive structure of the first intermediate refractive index optical layer 1504 and the second intermediate refractive index optical layer 1505 reduces a reflectance of the optical filter 1500. For this reason, the number of repetitions is set to be nine times, and the number of laminated layers is increased compared to Embodiment 1. The unit structure 1506 has an inclination angle $\phi$ of 29.1 degrees, which satisfies condition expression (1). The value of dH/dL is 2.33, which satisfies condition expression (2).

Figure 16:
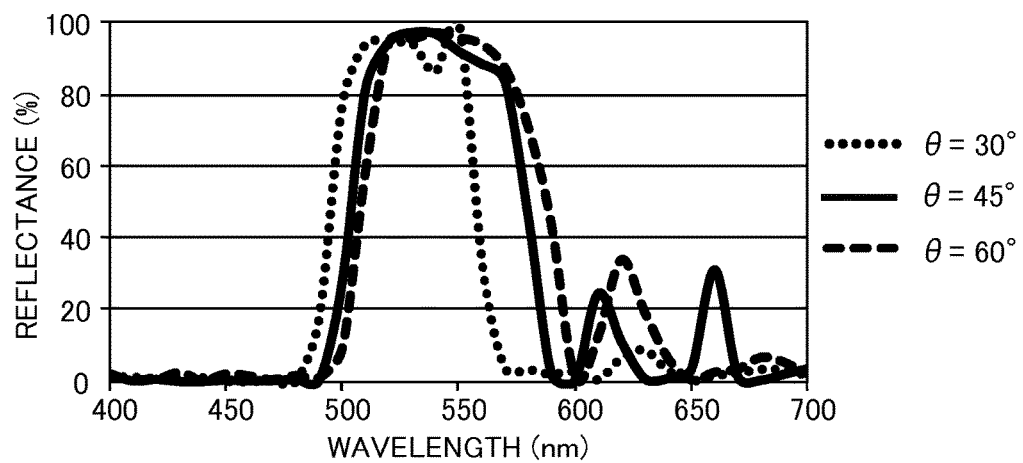
FIG. 16 illustrates an incident angle dependency of a spectral reflectance of the optical filter in Embodiment 3.

FIG. 16 illustrates an incident angle dependency of a spectral reflectance of the optical filter 1500 in the present embodiment, and illustrates reflectance spectra of a green band reflection dichroic filter. The incident plane is the XZ plane, and the polarization is P polarization (TM polarization). For a range of the incident angle $\theta$ from 30 to degrees, $\Delta\lambda$plus is 25 nm, which satisfies condition expressions (4) and (5). $\lambda_0$ is 540 nm, which satisfies condition expressions (6) to (8) as listed in Table 5. Structure parameters satisfy condition expressions (9) to (13). A reflectance of the blue band for $\theta=45°$ is averaged to be 10% approximately in Embodiment 1G, but averaged to be 5% or less in the present embodiment, which indicates a large reduction of unnecessary reflected light. On the other hand, for the red band, narrow band reflection depending on the total number of layers in the structure occurs but is averaged to be 10% approximately, which is substantially the same compared to Embodiment 1G. As described above, the introduction of the intermediate refractive index optical layers in the optical filter 1500 in the present embodiment provides a ripple reduction.

The present embodiment is not limited to the designing example of the green band reflection dichroic filter. Substantially constant multiplications of dH, dL, W1, W2, D, dM1, and dM2 among the structure parameters for the green band enable designing of the blue band reflection dichroic filter and the red band reflection dichroic filter.

Embodiment 4

Next, an optical filter in Embodiment 4 of the present invention will be described. The optical filter in the present embodiment is designed to reduce any reflected wavelength shift for the incident angle range of 0 to 60 degrees. The optical filter in the present embodiment does not use zeroth reflected light and is configured such that a zeroth transmission spectrum does not change in effect for a desired incident angle range.

The optical filter in the present embodiment has a configuration as illustrated in FIG. 6. The optical filter 600 includes optical layers 602 and 603 alternately laminated on the substrate 601 (synthetic quartz substrate) having a refractive index ns of 1.47, the optical layer 602 (first optical layer) having a refractive index nH of 2.36 and made of $TiO_2$, and the optical layer 603 (second optical layer) having a refractive index nL of 1.47 and made of $SiO_2$. The optical layer 602 has a physical layer thickness dH of 75 nm, and the optical layer 603 has a physical layer thickness dL of 35 nm. The optical filter 600 includes the optical layer 602 and the optical layer 603 alternately laminated 12 times. The optical filter 600 includes the unit structures 604 each including multi-layer structure having widths W1 and W2 of 175 nm and arranged in the X direction being shifted by a shift amount D of 55 nm given by (dL+dH)/2 in the Z direction. The unit structures 604 have identical shapes in the Y direction.

Each of Embodiments 1 to 3 describes the structure including the unit structures periodically arranged to form the one-dimensional grating. On the other hand, in the optical filter 600 in the present embodiment, neighboring unit structure 604 are disposed with the untidiness Δz of a shift in the Z direction between neighboring unit structures. The untidiness Δz between the unit structures is calculated by inputting a random number in a range of 0 to 1 to a normalized inverse normal cumulative distribution function having an average of 0 nm and a standard deviation σ of 25 nm. The untidiness Δz is set so as to satisfy condition expression (12).

Structure parameters of the unit structure 604 are listed in Table 6. All the parameters except for an increased number of repetitions of 12 times are shared with Embodiment 2. The FDTD calculation can only calculate the electric field time evolution of a finite calculation region, and thus the calculation cannot be performed for a reflectance and transmissivity of a completely random structure. To reproduce the random structure as closely as possible, a spectrum of a structure of 25 unit structures arranged with the randomness is calculated five times for different sets of random numbers. These spectra are then averaged to approximately calculate spectra illustrated in FIGS. 17A to 17D.

Figure 17A:
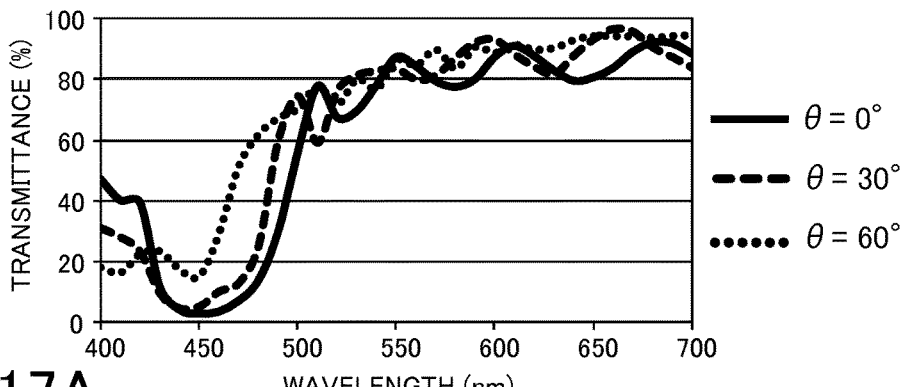
FIGS. 17A to 17D illustrate incident angle dependencies of spectral transmittance and spectral reflectance of an optical filter in Embodiment 4.
Figure 17B:
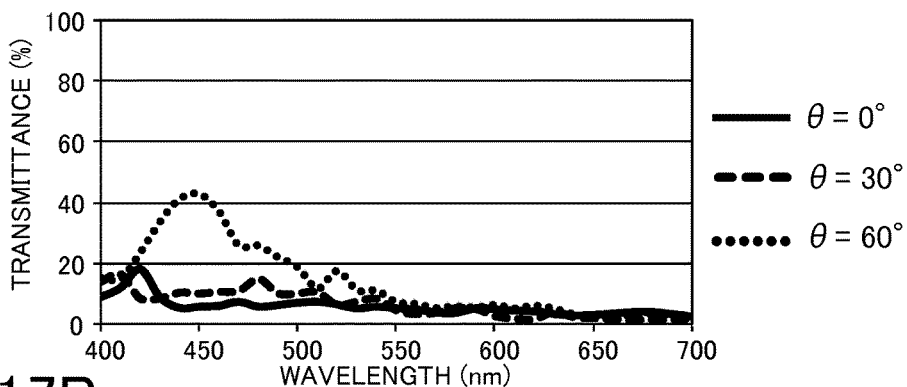
Figure 17C:
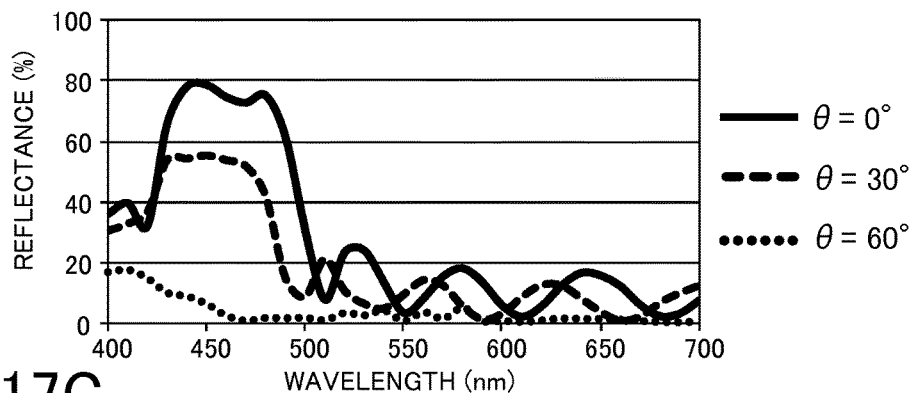
Figure 17D:
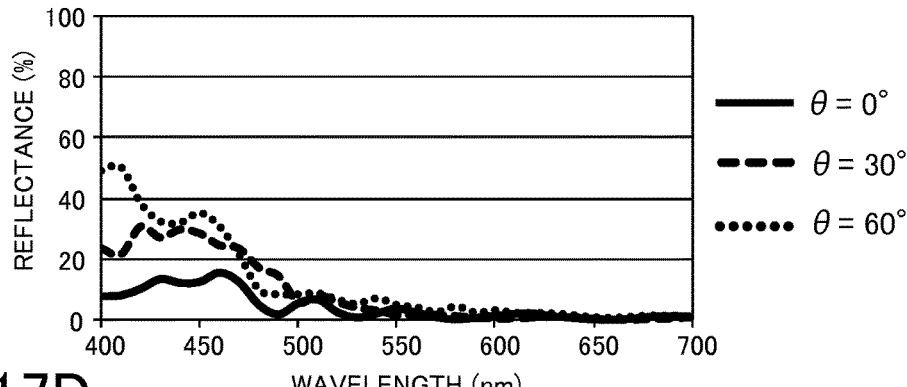

FIG. 17A illustrates a zeroth diffraction order transmissivity spectrum of the blue band reflection color filter in the present embodiment. FIG. 17B illustrates a first diffraction order transmissivity spectrum thereof. FIG. 17C illustrates a zeroth diffraction order reflectance spectrum thereof. FIG. 17D illustrates a first diffraction order reflectance spectrum thereof. The incident plane is the XZ plane, and the polarization is P polarization (TM polarization). For a range of the incident angle θ from 0 to 60 degrees, the blue band having a central wavelength of 450 nm is reflected with Δλplus of −25 nm, which satisfies condition expressions (4) and (5). As shown in Table 6, the conditions represented by condition expressions (6) to (8) are satisfied. Condition expressions (9) to (13) are satisfied by structure parameters in Table 6. The reflectance in the present embodiment is lower than that in Embodiment 2, and narrow band reflection in a transmission target band is reduced with an average transmissivity of 80% being achieved. This indicates that the introduction of the randomness reduces the narrow band reflection in the transmission target band.

The present embodiment describes properties of the structure including the arrangement formed with random Δz, but is not limited thereto. The randomness may be provided not only to the arrangement but also to the structure parameters of dH, dL, W1, W2, D, and P. Substantially constant multiplication of the structure in the present embodiment enables designing of a reflection color filter for a range from the green band to the red band.

Embodiment 5

Figure 18:
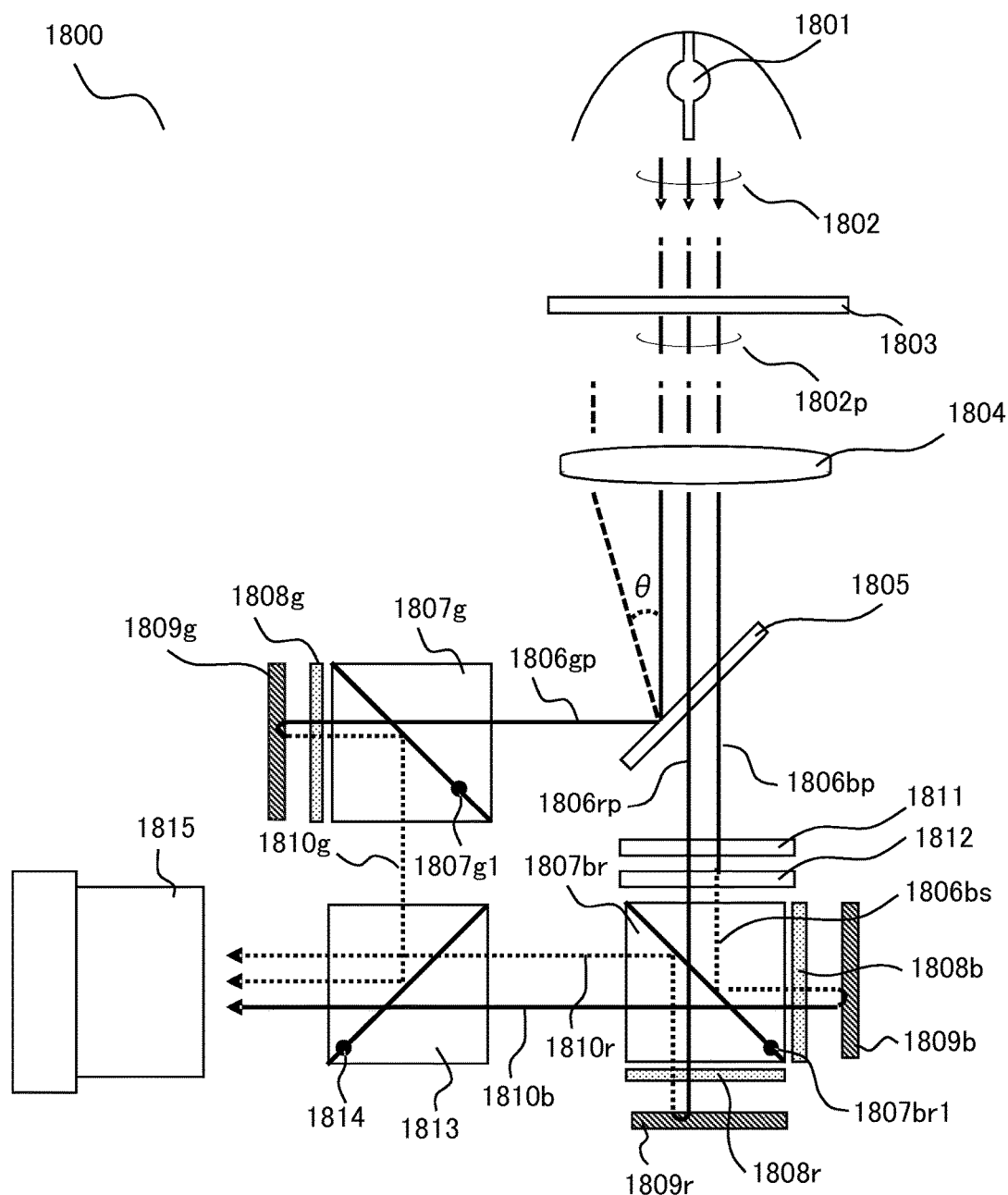
FIG. 18 is a configuration diagram of an image display apparatus in Embodiment 5.

Next, referring to FIG. 18, an image display apparatus (optical apparatus) in Embodiment 5 of the present invention will be described. FIG. 18 is a configuration diagram of an image display apparatus 1800.

The image display apparatus 1800 includes a light source 1801, a polarizer 1803, a lens 1804, a dichroic filter 1805, a polarizing beam splitter 1807, a phase compensator 1808, an image display element 1809, a polarizer 1811, and a color-selective phase plate 1812. With such a configuration, the image display apparatus 1800 can generate image light. The image display apparatus 1800 includes a synthesis prism 1813, a dichroic film 1814, and a projection optical system 1815, and synthesizes and projects image light in each band.

An illumination light beam 1802 emitted from the light source 1801 is incident on the polarizer 1803 and becomes an illumination light beam 1802p having P polarization. Next, the illumination light beam 1802p is condensed through the lens 1804 and is made incident on the dichroic filter 1805 that reflects the green band. The light beam incident on the dichroic filter 1805 that reflects the green band is incident at an aperture half-angle of the angle θ through the condensation. A blue band light beam 1806bp and a red band light beam 1806rp are transmitted through the dichroic filter 1805.

A green band light beam 1806gp is reflected by the dichroic filter 1805 and is made incident on a polarizing beam splitter 1807g. The polarizing beam splitter 1807g is an element that transmits P polarized light of a polarized light incident on a polarization separation surface 1807g1 and reflects S polarized light thereof, and thus transmits the green band light beam 1806gp. The green band light beam 1806gp is made incident on a phase compensator 1808g and an image display element 1809g and converted into distribution including image information. Then, the green band light beam 1806gp has its polarization converted into S polarization and becomes a green band image light 1810g. After that, the image light 1810g is made incident on the polarizing beam splitter 1807g again and reflected by the polarization separation surface 1807g1. Thus, the image light 1810g is emitted into an optical path different from an incident optical path and propagates in a direction toward the synthesis prism 1813.

The blue band light beam 1806bp and the red band light beam 1806rp are transmitted through the polarizer 1811 to have their polarization degrees improved, and then are made incident on the color-selective phase plate 1812. The color-selective phase plate 1812 has a property of converting a polarization direction of the blue band light beam by 90°. This makes the blue band light beam (as a blue band light beam 1806bs) incident on a polarizing beam splitter 1807br with its polarization direction rotated by 90° while the polarization of the red band light beam is maintained. The polarizing beam splitter 1807br is an element that transmits P polarized light and reflects S polarized light among polarized light incident on a polarization separation surface 1807r1. Elements having such an effect include a polarization separation surface 1807br1 on which thin films having refractive indices different from each other are laminated. The polarization separation surface 1807br1 of the polarizing beam splitter 1807br reflects the blue band light beam 1806bs and transmits the red band light beam 1806rp, thereby achieving color separation.

The blue band light beam 1806bs and the red band light beam 1806rp are respectively transmitted through phase compensators 1808b and 1808r, made incident on corresponding image display elements 1809b and 1809r, and converted into distribution including image information. These image light beams are again transmitted through the phase compensators 1808b and 1808r and made incident on the polarizing beam splitter 1807br. Image light 1810b of the blue band light beam is transmitted through the polarization separation surface 1807br1. Image light 1810r of the red band light beam is reflected by the polarization separation surface 1807br1. In this manner, the image light 1810b and 1810r are synthesized and made incident on the synthesis prism 1813. The dichroic film 1814 in the synthesis prism 1813 reflects the image light 1810g of the green band light beam and transmits the image light 1810b of the blue band light beam and the image light 1810r of the red band light beam, so that the blue, green, and red band image light is synthesized and emitted. This color-synthesized image light is projected and imaged by the projection optical system 1815.

In the image display apparatus 1800, a white light beam having the aperture half-angle of the angle θ is incident on the dichroic filter 1805 and the dichroic film 1814 that reflect the green band. The optical filter in each of the embodiments can be used as the dichroic filter 1805 and the dichroic film 1814 that reflect the green band so as to reduce a color change caused in a conventional multi-layer structure due to a wavelength change depending on the incident angle.

When the optical filter as comparative example 1 is used as the dichroic filter 1805 and the dichroic film 1814 that transmit the green band, a chromaticity coordinate is (X, Y)=(0.40, 0.40) for θ=31°. The chromaticity coordinate is (X, Y)=(0.23, 0.53) for θ=59°. A coordinate change mount due to this angle change is (ΔX, ΔY)=(−0.17, 0.13), and color largely changes depending on the incident angle.

On the other hand, when the optical filter in Embodiment 1G is used as the dichroic filter 1805 and the dichroic film 1814 that reflect the green band, the chromaticity coordinate is (X, Y)=(0.28, 0.60) for θ=31°. The chromaticity coordinate is (X, Y)=(0.36, 0.58) for θ=59°. The coordinate change amount due to this angle change is (ΔX, ΔY)=(−0.08, 0.02), which indicates a largely reduced color change. Thus, the use of the optical element (optical filter) in each of the embodiments in the image display apparatus 1800 can reduce a color change depending on the incident angle.

In each of the embodiments, a multi-layer structure includes arrangement of staggered unit structures each having a shift amount in a lamination direction. In this manner, an optical filter having a reduced change of a reflected wavelength for a desired incident angle range can be provided.

The present invention can provide an optical filter having a reduced change of a reflected wavelength within a desired incident angle range, and an optical apparatus having reduced color degradation.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, the first and the second multi-layers may each include any other layer than the first and the second optical layer. This other layer may be disposed between the first optical layer and the second optical layer.

This application claims the benefit of Japanese Patent Application No. 2014-013869, filed on Jan. 29, 2014, which is hereby incorporated by reference wherein in its entirety.

TABLE 1

|  | dH (nm) | nH | dL (nm) | nL | ns | Repetition m |
|---|---|---|---|---|---|---|
| Simple multi-layer | 50 | 2.36 | 80 | 1.47 | 1 | 9 |

|  | dH (nm) | nH | dL (nm) | nL | D (nm) | W1 (nm) |
|---|---|---|---|---|---|---|
| Staggered multi-layer | 50 | 2.36 | 80 | 1.47 | 65 | 150 |

|  | W2 (nm) | ns | Repetition m |
|---|---|---|---|
| Staggered multi-layer | 150 | 1 | 9 |

TABLE 2

|  | Designed center wavelength (nm) | dH (nm) | nH | dL (nm) |
|---|---|---|---|---|
| Embodiment 1B | 440 | 85 | 2.36 | 35 |
| Embodiment 1G | 540 | 105 | 2.36 | 45 |
| Embodiment 1R | 640 | 130 | 2.36 | 40 |

|  | nL | D (nm) | W1 (nm) | W2 (nm) | ns | Repetition m |
|---|---|---|---|---|---|---|
| Embodiment 1B | 1.47 | 60 | 110 | 110 | 1.47 | 8 |
| Embodiment 1G | 1.47 | 75 | 135 | 135 | 1.47 | 8 |
| Embodiment 1R | 1.47 | 85 | 160 | 160 | 1.47 | 10 |

|  | Condition expression (1) φ (°) | Condition expression (2) dH/dL | Condition expression (4) Δλplus (nm) | Condition expression (5) |
|---|---|---|---|---|
| Embodiment 1B | 28.7 | 2.42 | 20 | 0.366 |
| Embodiment 1G | 29.1 | 2.33 | 22.5 | 0.366 |
| Embodiment 1R | 28.0 | 3.25 | 25 | 0.366 |

|  | Condition expression (6) (°) | Condition expression (6) Range (°) | Condition expression (7) (nm) | Condition expression (7) Range (nm) |
|---|---|---|---|---|
| Embodiment 1B | 57.6 | 22.5 to 67.5 | 221 | 154 to 286 |
| Embodiment 1G | 59.1 | 22.5 to 67.5 | 274 | 189 to 351 |
| Embodiment 1R | 55.9 | 22.5 to 67.5 | 320 | 224 to 416 |

|  | Condition expression (8) (nm) | Condition expression (8) Upper limit (nm) |
|---|---|---|
| Embodiment 1B | 220 | 374 |
| Embodiment 1G | 270 | 459 |
| Embodiment 1R | 320 | 544 |

TABLE 3

| | Designed center wavelength (nm) | dH (nm) | nH | dL (nm) |
|---|---|---|---|---|
| Embodiment 2 | 435 | 75 | 2.36 | 35 |

| | nL | D (nm) | W1 (nm) | W2 (nm) | ns | Repetition m |
|---|---|---|---|---|---|---|
| Embodiment 2 | 1.47 | 55 | 175 | 175 | 1.47 | 8 |

| | Condition expression (1) φ (°) | Condition expression (2) dH/dL | Condition expression (4) Δλplus (nm) | Condition expression (5) |
|---|---|---|---|---|
| Embodiment 2 | 17.4 | 2.14 | 20 | 0.5 |

| | Condition expression (6) (°) | Condition expression (6) Range (°) | Condition expression (7) (nm) | Condition expression (7) Range (nm) |
|---|---|---|---|---|
| Embodiment 2 | 31.8 | 15.0 to 45 | 218 | 152 to 283 |

| | Condition expression (8) (nm) | Condition expression (8) Upper limit (nm) |
|---|---|---|
| Embodiment 2 | 350 | 370 |

TABLE 4

| | Designed center wavelength (nm) | dH (nm) | nH | dL (nm) |
|---|---|---|---|---|
| Comparative example 2 | 440 | 75 | 2.36 | 35 |

| | nL | ns | Repetition m | Condition expression (4) Δλplus (nm) |
|---|---|---|---|---|
| Comparative example 2 | 1.47 | 1.47 | 8 | −70 |

TABLE 5

| | Designed center wavelength (nm) | dH (nm) | nH | dL (nm) |
|---|---|---|---|---|
| Embodiment 3 | 540 | 105 | 2.36 | 45 |

| | nL | D (nm) | W1 (nm) | W2 (nm) | ns | Repetition m |
|---|---|---|---|---|---|---|
| Embodiment 3 | 1.47 | 75 | 135 | 135 | 1.47 | 9 |

| | Designed center wavelength (nm) | dM1 (nm) | nM1 | dM2 (nm) | nM2 | Repetition m' |
|---|---|---|---|---|---|---|
| Embodiment 3 | 540 | 95 | 1.67 | 85 | 1.76 | 2 |

| | Condition expression (1) φ (°) | Condition expression (2) dH/dL | Condition expression (4) Δλplus (nm) | Condition expression (5) |
|---|---|---|---|---|
| Embodiment 3 | 29.1 | 2.33 | 25 | 0.366 |

| | Condition expression (6) (°) | Condition expression (6) Range (°) | Condition expression (7) (nm) | Condition expression (7) Range (nm) |
|---|---|---|---|---|
| Embodiment 3 | 59.1 | 22.5 to 67.5 | 274 | 189 to 351 |

| | Condition expression (8) (nm) | Condition expression (8) Upper limit (nm) |
|---|---|---|
| Embodiment 3 | 270 | 459 |

TABLE 6

| | Designed center wavelength (nm) | dH (nm) | nH | dL (nm) |
|---|---|---|---|---|
| Embodiment 4 | 435 | 75 | 2.36 | 35 |

| | nL | D (nm) | W1 (nm) | W2 (nm) | ns | Repetition m |
|---|---|---|---|---|---|---|
| Embodiment 4 | 1.47 | 55 | 175 | 175 | 1.47 | 12 |

| | Condition expression (1) φ (°) | Condition expression (2) dH/dL | Condition expression (4) Δλplus (nm) | Condition expression (5) |
|---|---|---|---|---|
| Embodiment 4 | 17.4 | 2.14 | 20 | 0.5 |

| | Condition expression (6) (°) | Condition expression (6) Range (°) | Condition expression (7) (nm) | Condition expression (7) Range (nm) |
|---|---|---|---|---|
| Embodiment 4 | 31.8 | 15.0 to 45 | 218 | 152 to 283 |

| | Condition expression (8) (nm) | Condition expression (8) Upper limit (nm) |
|---|---|---|
| Embodiment 4 | 350 | 370 |

What is claimed is:

1. An optical filter comprising:
a first multi-layer having a width W1 and including a first optical layer and a second optical layer that are made of materials different from each other and that are alternately laminated, the first optical layer having a refractive index nH and an average layer thickness dH, and the second optical layer having a refractive index nL lower than the refractive index nH and an average layer thickness dL; and
a second multi-layer having a width W2 and including the first and the second optical layers alternately laminated,
wherein the first and the second multi-layers are included in each of unit structures arranged being shifted from each other by a shift amount D in a lamination direction of the first and the second optical layers, the unit structures being arranged in an array direction orthogonal to the lamination direction, and
expressions below are satisfied:

$$15° < \varphi < 35°$$

$$1.8 < dH/dL < 5.0$$

$$(W1 + W2) < 0.85 * \lambda_0$$

where an inclination angle $\phi$ of each of the unit structures is defined to be $\tan^{-1}(|D|/0.5(W1+W2))$ for $|D|$ not greater than $0.5(dL+dH)$ and $\tan^{-1}(((dL+dH)-|D|)/0.5(W1+W2))$ for $|D|$ greater than $0.5(dL+dH)$, $|\theta|\max$ and $|\theta|\min$ respectively represent a maximum value and a minimum value of an absolute value of an incident angle range of a light beam on an incident plane parallel to the lamination direction and the array direction, and $\lambda_0$ represents a reflection center wavelength of P polarized light for an incident angle $(|\theta|\max+|\theta|\min)/2$.

2. The optical filter according to claim 1, wherein expressions below are satisfied:

$$|\Delta\lambda\text{plus}|<30 \text{ nm}$$

$$\cos|\theta|\min-\cos|\theta|\max>0.365$$

where $\lambda$plus represents a wavelength at a reflectance of 50% on a skirt on a long wavelength side of a reflection band of the optical filter, and $\Delta\lambda$plus represents a wavelength shift amount when an incident angle of P polarized light is changed from $|\theta|\min$ to $|\theta|\max$.

3. The optical filter according to claim 2, wherein the average layer thicknesses dH and dL and the refractive indices nH and nL satisfy an expression below:

$$0.35*\lambda_0<(nH*dH+nL*dL)\cos\phi<0.65*\lambda_0$$

where $\lambda_0$ represents a reflection center wavelength of P polarized light for an incident angle $(|\theta|\max+|\theta|\min)/2$.

4. The optical filter according to claim 1, wherein an expression below is satisfied:

$$0.5(|\theta|\max+|\theta|\min)/2<\sin^{-1}(n_{\text{eff}}*\sin\phi)<1.5(|\theta|\max+|\theta|\min)/2$$

where $|\theta|\max$ and $|\theta|\min$ respectively represent a maximum value and a minimum value of an absolute value of an incident angle range of a light beam, and $n_{\text{eff}}$ is defined to be $\{2/(1/nH^2+1/nL^2)\}^{1/2}$.

5. The optical filter according to claim 1, wherein the shift amount D satisfies an expression below:

$$0.25(dH+dL)\leq|D|\leq0.75(dH+dL).$$

6. The optical filter according to claim 1, wherein an expression below is satisfied:

$$0.5\leq(W1+W2)/P\leq1$$

where P represents a distance between centers of neighboring unit structures among the unit structures.

7. The optical filter according to claim 1, wherein an untidiness $\Delta z$ of the shift amount D between neighboring unit structures in the lamination direction satisfies an expression below:

$$0\leq\Delta z\leq2(dH+dL).$$

8. The optical filter according to claim 1, wherein the width W1 of the first multi-layer and the width W2 of the second multi-layer satisfy expressions below:

$$W1>W2$$

$$W1/(W1+W2)\leq0.8.$$

9. The optical filter according to claim 1, wherein the first and the second multi-layers each include a ripple lowering layer.

10. The optical filter according to claim 9, wherein the ripple lowering layer has a refractive index between the refractive index nH and the refractive index nL.

11. The optical filter according to claim 9, wherein the ripple lowering layer includes third and fourth optical layers.

12. An optical apparatus comprising an optical filter, wherein the optical filter includes:

a first multi-layer having a width W1 and including a first optical layer and a second optical layer that are made of materials different from each other and that are alternately laminated, the first optical layer having a refractive index nH and an average layer thickness dH, and the second optical layer having a refractive index nL lower than the refractive index nH and an average layer thickness dL; and a second multi-layer having a width W2 and including the first and the second optical layers alternately laminated, wherein the first and the second multi-layers are included in each of unit structures arranged being shifted from each other by a shift amount D in a lamination direction of the first and the second optical layers, the unit structures being arranged in an array direction orthogonal to the lamination direction, and expressions below are satisfied:

$$15°<\phi<35°$$

$$1.8<dH/dL<5.0$$

$$(W1+W2)<0.85*\lambda_0$$

where an inclination angle $\phi$ of each of the unit structures is defined to be $\tan^{-1}(|D|/0.5(W1+W2))$ for $|D|$ not greater than $0.5(dL+dH)$ and $\tan^{-1}(((dL+dH)-|D|)/0.5(W1+W2))$ for $|D|$ greater than $0.5(dL+dH)$, $|\theta|\max$ and $|\theta|\min$ respectively represent a maximum value and a minimum value of an absolute value of an incident angle range of a light beam on an incident plane parallel to the lamination direction and the array direction, and $\lambda_0$ represents a reflection center wavelength of P polarized light for an incident angle $(|\theta|\max+|\theta|\min)/2$.

* * * * *